(12) United States Patent
Knaapila et al.

(10) Patent No.: US 10,090,076 B2
(45) Date of Patent: Oct. 2, 2018

(54) ANISOTROPIC CONDUCTIVE POLYMER MATERIAL

(75) Inventors: Matti Knaapila, Nittedal (NO); Mark Buchanan, Oslo (NO); Geir Helgesen, Finstadjordet (NO)

(73) Assignee: Condalign AS, Kjeller (NO)

( * ) Notice: Subject to any disclaimer, the term of this patent is extended or adjusted under 35 U.S.C. 154(b) by 187 days.

(21) Appl. No.: 13/326,579

(22) Filed: Dec. 15, 2011

(65) Prior Publication Data

US 2012/0145315 A1 Jun. 14, 2012

Related U.S. Application Data

(63) Continuation-in-part of application No. PCT/NO2010/000242, filed on Jun. 22, 2010, which
(Continued)

(30) Foreign Application Priority Data

Jun. 22, 2009 (NO) .................................... 20092381
Dec. 15, 2010 (NO) .................................... 20101761

(51) Int. Cl.
*B29C 65/52* (2006.01)
*H01B 1/22* (2006.01)
(Continued)

(52) U.S. Cl.
CPC ................ *H01B 1/22* (2013.01); *B29C 70/62* (2013.01); *B82Y 30/00* (2013.01); *C08J 3/20* (2013.01); *C09D 5/24* (2013.01); *C09D 7/70* (2018.01); *C09J 9/02* (2013.01); *C09J 11/04* (2013.01); *H01B 1/24* (2013.01); *B29K 2995/0005* (2013.01); *C08J 2300/24* (2013.01);
(Continued)

(58) Field of Classification Search
USPC ..... 156/272.2, 273.9, 275.5, 275.7; 252/500, 252/502, 518.1, 512; 264/440; 977/842
See application file for complete search history.

(56) References Cited

U.S. PATENT DOCUMENTS 5,534,101 A * 7/1996 Keyworth et al. ........ 156/244.12
5,769,996 A * 6/1998 McArdle et al. .......... 156/272.4
(Continued)

*Primary Examiner* — Daniel McNally
(74) *Attorney, Agent, or Firm* — Alix, Yale & Ristas, LLP

(57) ABSTRACT

A method for forming a body comprising a mixture of a matrix and conductive particles, whereby the conductive particles are formed into aligned conductive pathways in an alignment step by applying an electric field between alignment electrodes and thereafter stabilizing the mixture wherein the conductive particles have a low aspect ratio; and a polymeric composition and method for producing such composition which is curable by UV light to an anisotropic electrically conductive polymer layer, comprising i) providing a non-conductive matrix of a flowable polymer composition having inherent photocurability, ii) adding to matrix conductive particles having low aspect ratio in an amount to allow the concentration of the conductive particles to be maintained at a level lower than the percolation threshold, and iii) placing the formed composition in a receptacle where exposure to UV light is prevented, and a method for establishing an anisotropic electrically conductive, optionally thermally conductive.

8 Claims, 14 Drawing Sheets

Related U.S. Application Data is a continuation-in-part of application No. PCT/NO2010/000241, filed on Jun. 22, 2010, which is a continuation-in-part of application No. PCT/NO2010/000249, filed on Jun. 22, 2010.

(51) Int. Cl.

| | |
|---|---|
| B82Y 30/00 | (2011.01) |
| H01B 1/24 | (2006.01) |
| C08J 3/20 | (2006.01) |
| B29C 70/62 | (2006.01) |
| C09D 5/24 | (2006.01) |
| C09J 9/02 | (2006.01) |
| C09J 11/04 | (2006.01) |
| C09D 7/40 | (2018.01) |
| C08K 3/04 | (2006.01) |
| C08K 3/08 | (2006.01) |
| C08K 3/22 | (2006.01) |
| C08K 7/00 | (2006.01) |

(52) U.S. Cl.
CPC ............. *C08K 3/04* (2013.01); *C08K 3/042* (2017.05); *C08K 3/08* (2013.01); *C08K 3/22* (2013.01); *C08K 7/00* (2013.01); *C08K 2201/016* (2013.01)

(56) References Cited

U.S. PATENT DOCUMENTS

| | | | | |
|---|---|---|---|---|
| 5,891,366 | A * | 4/1999 | Gruenwald | C09J 9/02 156/272.8 |
| 2002/0086198 | A1* | 7/2002 | Ilno | C08F 290/064 429/508 |
| 2003/0051807 | A1* | 3/2003 | Yamaguchi | C08G 59/226 156/272.2 |
| 2005/0029498 | A1* | 2/2005 | Elkovitch | B82Y 10/00 252/500 |
| 2009/0038832 | A1* | 2/2009 | Chaffins et al. | 174/257 |

* cited by examiner

ANISOTROPIC CONDUCTIVE POLYMER MATERIAL

CROSS-REFERENCES TO RELATED APPLICATIONS

This application claims priority to Norwegian patent application No. 20101761, filed Dec. 15, 2010, the contents of which are incorporated herein by reference. This application is also a continuation-in-part of PCT/NO2010/000249, filed on Jun. 22, 2010, which claims priority to Norwegian patent application number 20092381, filed Jun. 22, 2009; and a continuation-in-part of PCT/NO2010/000241, filed on Jun. 22, 2010, which claims priority to Norwegian patent application number 20092381, filed Jun. 22, 2009; and a continuation-in-part of PCT/NO2010/000242, filed on Jun. 22, 2010, which claims priority to Norwegian patent application number 20092381, filed Jun. 22, 2009, the contents of all of which are incorporated herein by reference.

BACKGROUND OF THE INVENTION

Field of the Invention

The invention concerns a production method for forming an anisotropic conducting polymer body, such as a film or mat, comprising conductive paths of particles in the polymer matrix. The matrix can be an adhesive and be used for joining surfaces and connecting them electrically (Production).

The invention also concerns conductive and dissipative electrostatic discharge (ESD) devices, also known as antistatic devices and a method for manufacturing them, using conductive paths of low-cost particles in a curable nonconductive matrix (Electrostatic Discharge).

The invention also concerns use of an adhesive for connecting solar cell tabs to a solar cell busbar and making the adhesive conductive in an alignment step and a solar cell so produced (Solar Cell).

The invention also concerns a method for producing an polymer composition with the ability to be cured by UV light to an anisotropic electrically conductive polymer layer as well as adhesive composition so produced and a method for its subsequent use. This polymer can be, but need not be, adhesive in nature (UV Polymer).

Description of the Related Art

I. Production

Materials of electrically conductive polymer can be based on the mixture of polymer matrix and conductive particles embedded into the matrix or into an inherently conductive polymer.

In the former case the polymer matrix can be an adhesive and the electrically conductive particles metal or metal oxide or carbon particles such as carbon nanotubes (CNTs). The materials can also be directionally conductive. An electrically conductive material will usually also be thermally conductive. Wiedemann-Franz law states that the ratio of the electronic contribution to the thermal conductivity and the electrical conductivity of a metal is proportional to the temperature. For other materials the relationship is more complex.

The electrically conductive polymer films are usually produced by mixing the filler material with a polymer resin and in order to have a conductive mixture the amount of filler material shall exceed the percolation threshold. Mixed systems have limited lifetime and must be re-mixed prior to use.

In order to increase signal transmission capability without having to increase the amount of conductive filler material conductive films are made anisotropic. Anisotropic films can also be designed so that they have insulating properties in certain directions.

In EP 1809716 is described a method for making a directionally conductive adhesive based on CNTs. A tape having an insulation base and a parallel arrangement of CNTs acting as electrical contact points is made by growing carbon CNTs on a material used in the tape or arranging CNTs on the tape before adding the adhesive part to the tape.

In U.S. Pat. No. 5,429,701 is described how electric interconnection between discreet individual conductors of soft magnetic metal in two layers is achieved by adjoining the conductors by a conductive adhesive. The adhesive have particles of soft magnetic metal and by applying a magnetic field the particles can be gathered in an area between the conductors.

It is known that dipolar rigid asymmetric particles or molecules can be aligned by an electric field; this is especially used for small molecular weight liquid crystals.

In these cases material having permanent dipole moments is fluid in normal conditions, which makes electric field alignment possible.

Aligned structures of infusible conductive carbon particles, like CNTs, are known to be formed by chemical vapour deposition or spinning.

A method for the directional growth of CNTs is shown in U.S. Pat. No. 6,837,928. CNTs are grown in an electric field that directs their growth and thus leads to aligned CNTs when the growing procedure is completed.

Electric field alignment of carbon nanocone (CNC) material has been demonstrated in Svåsand et al. Colloids & Surf. A Physicochem. Eng. Aspects 2007 308, 67 and 2009 339 211. In these articles it is shown that nanocone material dispersed in silicon oil can form micron size nanocone "fibres" when a field of minimum 50 V/mm is applied. In order to form fibres within a reasonable time fields of 400 V/mm is used.

In Schwarz et al. Polymer 2002, 43, 3079 "Alternating electric field induced agglomeration of carbon black filled resins" is reported how carbon black filled resins below zero-field percolation threshold can form electrically conductive networks when a field of 400 V/cm is applied between copper electrodes dipped into the resin. This result has been reproduced by Prasse et al. Compos. Sci. Tech. 2003, 63, 1835.

U.S. 20090038832 describes a method for forming an electrical path having a desired resistance from a mixture of carbon and metallic nanotubes dispersed in a curable polymer matrix. Electrodes are placed in contact with the dispersion and electrical energy is applied until the desired electrical resistance is reached. A pure semi-conducting connection can be achieved by burning away metallic nanotubes that may be part of the carbon nanotube mixture, by applying a current after the deposition. The polymer matrix is cured in order to fix the device. Essentially same result has been achieved using copper particles in US20030102154A1.

A disadvantage with the method is that carbon nanotubes are very expensive and difficult to produce on an industrial scale. A dispersion of nanotubes is difficult to store and require specific manufacturing steps like homogination or sonication prior to application of the dispersion to the substrate and electrode.

These methods are dedicated to the use of microelectronics and circuit boards. Moreover, they aim at connecting the alignment electrodes so that the alignment is a step-wise procedure where the alignment electrodes are connected to the material and remain in the end product.

II. Elecrostatic Discharge

When two objects of dissimilar materials are rubbed together electrons are transferred from one material to the other through the process of triboelectrification. The objects become statically charged with one material accumulating positive charge and the other material accumulating negative charge. The process of safely discharging electrostatic charges or preventing or minimizing their occurrence, e.g. in a manufacturing or workplace environment, is accomplished through ESD devices. These devices have the effect of reducing static electricity charges on a person's body or equipment, for example to prevent fires and explosions when working with flammable liquids and gases, or to prevent damage to static-sensitive objects such as electronic components or devices.

The term Electrostatic discharge (ESD) device as used here includes conductive and dissipative devices, films and adhesives There are many standards relating to ESD. The ESD Association (www.esda.org) has published 35 standards covering ESD in the electronics environment. CENELEC has issued a European electrostatic standard EN100015—Protection of Electrostatic Sensitive Devices.

ESD devices have many areas of use, such as:
ESD packaging devices including films, bags, and rigid structures used to contain devices, such as graphics cards or hard disk drives under transport or storage. Such films can also be used in the production of batteries or capacitors, forming a conductive barrier inside the battery or capacitor.
ESD garment devices such as clothes and shoes, used in many workplaces.
ESD agents or compounds used for treatment of materials or their surfaces in order to reduce or eliminate build-up of static electricity
ESD mats and floors, ranging from small mats for keyboards and mice and larger mats or entire floors
ESD workstations and work surfaces provide an electrical path to ground for the controlled dissipation of any static potential on materials that contact the surface.
ESD parts such as gaskets.

The terms conductive and dissipative can broadly be defined as:
Conductive: Materials with a resistance of between 1 k$\Omega$ and 1 M$\Omega$
Dissipative: Materials with a resistance of between 1 M$\Omega$ and 1 T$\Omega$ The Electrostatic Discharge Association's document ESD ADV1.0-2009 provides the following definitions applicable in the current context:
conductive material, resistivity: A material that has a surface resistivity less than 1×10E5 ohms/square or a volume resistivity less than 1×10E4 ohm-cm.
conductive material, resistance: A material that has a surface resistance of less than 1×10E4 ohms or a volume resistance of less than 1×10E4 ohms.
conductive flooring material: A floor material that has a resistance to ground of less than 1.0×10E6 ohms.
dissipative floor material: Floor material that has a resistance to ground between 1.0×10E6 and 1.0×10E9 ohms.
dissipative materials: A material that has a surface resistance greater than or equal to 1×10E4 ohms but less than 1×10E11 ohms or a volume resistance greater than or equal to 1×10E4 ohms but less than 1×10E11 ohms.

The present invention concerns conductive and dissipative ESD devices, and we use the common term ESD device for these. The term "antistatic" is also a common synonym for "electrostatic discharge", e.g. used in "Antistatic device" as a synonym for ESD device; i.e. we use the term ESD device as equivalent to antistatic device.

In the production of such conductive and dissipative devices like antistatic films and bags, shoes, mats and floors, polymers are well suited for use at the outer surface. Other materials that similarly can change viscosity during production are also suited. The materials are manufactured into a film or a sheet which can be laminated or a liquid coating which can be sprayed on or the device dipped in, and then cured by spontaneous reaction of the material, or accelerated by the use of e.g. heat or UV light Electrically conductive polymer containing materials can be based on the mixture of a polymer matrix and conductive particles (fillers) embedded into this matrix, or inherently conductive polymers.

Electrically conductive or dissipative polymer materials which are of interest to this invention are based on the mixture of a nonconductive polymer matrix and conductive particles (fillers) embedded into this matrix; Inherent conductive polymers are also known and alloyed with nonconductive polymers can form conductive or dissipative materials.

The addition of filler changes some of the bulk properties of the polymer matrix. These changes are frequently undesirable, e.g. a decrease in material strength and transparency and change in colour. It is important to lower the filler content to minimize these effects.

In the present invention the polymer matrix can be an adhesive and the electrically conductive particles; metal, metal oxides, metal-colloid particles, or carbon particles such as carbon nanotubes (CNTs). The materials can also be directionally conductive.

The electrically conductive or dissipative polymer films are usually produced by mixing the filler material with a polymer resin and in order to have a conductive mixture the amount of filler material must exceed the percolation threshold. Mixed systems have limited lifetime and must be re-mixed prior to use. A common problem is that a film or layer even when manufactured to a uniform thickness, will have non-uniform conductivity because the filler material will not distribute evenly. The problem is well-known in polymer physics and stems from the mutual incompatibilities of filler materials and polymer matrix, which means that only small amount of fillers can be mixed with the matrix to lead to the stable mixture. Higher amounts will macrophase separate with time. Therefore, this problem is fundamental in nature. Moreover, the mixing process applied for higher filler quantities must be so vigorous that the filler particles may get broken.

U.S. Pat. No. 4,269,881 and U.S. Pat. No. 5,348,784 teaches the production of carpet products where conductive fibres are mixed into the base of an adhesive. U.S. Pat. No. 4,724,187 teaches the similar for conductive laminate flooring.

U.S. 2005/0206028A1 teaches electrically conductive flooring formed of a conductive loaded resin-based material that comprises micron sized conductive powder, conductive fibre or a combination in 20% to 50% by weight of the total conductive resin. WO 2010018094A2 teaches a similar invention for a substrate-free conductive surface.

U.S. Pat. No. 4,101,689 teaches an electrically conductive floor covering comprising a sheet of a thermoplastic synthetic resin, substantially non conducting, said sheet having a plurality of holes penetrating there through and electrically conductive material filling said holes.

U.S. Pat. No. 4,944,998 teaches a surface covering vinyl floor tile product having static dissipative electrical properties and a method of producing the same.

U.S. Pat. No. 7,060,241B2 discloses an electrically conductive film using single-walled CNT giving conductivity and transparency. The CNT can be oriented by exposing the films to a shearing step.

In order to increase signal transmission capability or dissipative discharge without having to increase the amount of conductive filler material, conductive films can be made anisotropic. Anisotropic films can also be designed so that they have insulating properties in certain directions.

In EP 1809716 is described a method for making a directionally conductive adhesive based on CNTs. A tape having an insulation base and a parallel arrangement of CNTs acting as electrical contact points is made by growing carbon CNTs on a material used in the tape or arranging CNTs on the tape before adding the adhesive part to the tape.

In U.S. Pat. No. 5,429,701 is described how electric interconnection between discreet individual conductors of soft magnetic metal in two layers is achieved by adjoining the conductors by a conductive adhesive. The adhesive have particles of soft magnetic metal and by applying a magnetic field the particles can be gathered in an area between the conductors.

It is known that dipolar rigid asymmetric particles or molecules can be aligned by an electric field; this is especially used for small molecular weight liquid crystals.

In these cases the material having permanent dipole moments is fluid under normal conditions, a fact which makes electric field alignment possible.

Aligned structures of infusible conductive carbon particles, like CNTs, are known to be formed by chemical vapour deposition or spinning.

A method for the directional growth of CNTs is shown in U.S. Pat. No. 6,837,928. CNTs are grown in an electric field which directs their growth and thus leads to aligned CNTs when the growing procedure is completed.

Mixing of CNCs with diverse materials has been described in document WO2006052142. In this description CNCs form isotropic mixture with the matrix.

In document WO2008009779 electric field is used to induce sintering in nanoparticle coating.

Electric field alignment of carbon nanocone (CNC) material has been demonstrated in Svåsand et al. Colloids & Surf. A Physicochem. Eng. Aspects 2007 308, 67 and 2009 339 211. In these articles it is shown that nanocone material dispersed in silicon oil can form micron size nanocone "fibres" when a field of minimum 50 V/mm is applied. In order to form fibres within a reasonable time, fields of 400 V/mm are used.

In Schwarz et al. Polymer 2002, 43, 3079 "Alternating electric field induced agglomeration of carbon black filled resins" it is reported how carbon black filled resins below zero-field percolation threshold can form electrically conductive networks when a field of 400 V/cm is applied between copper electrodes dipped into the resin.

U.S. 20090038832 describes a method for forming an electrical path having a desired resistance from carbon nanotubes dispersed in a curable polymer matrix. Electrodes are placed in contact with the dispersion and electrical energy is applied to the carbon nanotubes until the desired electrical resistance is reached. A pure semi-conducting connection can be achieved by burning away metallic nanotubes that may be part of the carbon nanotube mixture, by applying a current after the deposition. The polymer matrix is cured in order to fix the device.

A disadvantage with prior art is that carbon nanotubes are very expensive and difficult to produce on an industrial scale. A dispersion of nanotubes is difficult to store and require specific manufacturing steps like homogenation or sonication prior to application of the dispersion to the substrate. The process of making holes in the polymer matrix to be filled by conductive materials as described in U.S. Pat. No. 4,101,689A is also complicated.

There is, therefore, a need for a more cost effective manufacturing method giving devices, films and adhesives with uniform conductivity and improved mechanical and optical properties.

III. Solar Cell

Interconnections between surface electrodes, solar cell tabs, of solar cells are often formed by soldering but there is an increasing demand to replace it by alternative methods. This trend is driven by technical and economic as well as by environmental factors.

Soldering has the following problems. Firstly, soldering requires heavy metals such as lead which are toxic and require expensive measures when the cells are disposed. Secondly, in order to decrease materials costs, there is a trend to decrease the thickness of solar cells. However, thinner layers suffer from cracks arising from soldering. Thirdly, soldering may cause oxidation of connected materials.

There are two emerging possibilities to overcome the shortcomings of soldering. Ultrasonic welding, where local acoustic vibrations create a solid lead-free weld is one option and another is to use conductive adhesives.

During the soldering process the solder is applied at high temperatures. When the surface cools the solidified solder induces stress across the surface. This can have detrimental effects to the solar cells as excess stress will promote breakage and warping of the surface. This becomes increasingly problematic when solar cells are produced thinner to reduce material usage and costs. Therefore conductive adhesives are a particularly interesting technology to replace the solders currently used.

In document WO 2008026356 is described an electric connection between an electrode of a solar cell and a wire member by a conductive adhesive film comprising at least 9% rubber and containing conductive particles having a diameter of 1.33-0.06% of the film thickness and a volume of conductive particles between 1.7-15.6 vol % and preferable between 2-12 or 3-8 vol % of the total volume in order to create an adhesive layer with adjoining conductive particles which overcome effects of surface roughness of the electrodes.

Conductive adhesives proposed for solar cell panel production comprises a relatively high fraction of conductive particles such as silver (>1.7 vol-%) in order to secure conductivity of the resulting film. This constitutes a problem because high amounts of conductive particles weakens mechanical properties of the adhesive and increases material cost.

The known conductive adhesives are isotropic mixtures of conductive fillers (e.g. silver or carbon) and polymer matrix. Therefore, in order to form conductive paths of macroscopic dimension, the load of conductive particles must be so high that the particles touch each other forming these paths. The particle packing mirroring this conduction mechanism is understood as the percolation model. The lowest particle fraction where this happens is denoted percolation threshold. For diverse spherical or largely 3-dimensional particles, this threshold is theoretically between 1-17 vol %, but in practice the lower limit is usually not sufficient for securing conductivity.

One exception to the above are modified CNTs whose percolation threshold can be as low as 0.1 vol % due to their highly anisotropic rod like shape that greatly deviates from 3-dimensional particles. A disadvantage of such CNTs is, however, that they are difficult to produce on an industrial scale.

In Schwarz et al. Polymer 43, 3079, 2002 "Alternating electric field induced agglomeration of carbon black filled resins" is observed how carbon black (CB) filled resins below zero-field percolation threshold can form CB networks when a field of 400 V/cm is applied between copper electrodes dipped into the resin.

U.S. 20090038832 describes a method for forming an electrical path having a desired resistance from carbon nanotubes dispersed in a curable polymer matrix. Electrodes are placed in contact with the dispersion and electrical energy in the form of a dielectrophoretic signal at 8 V, 1 MHz is applied over the electrode gap and resistance monitored until a desired electrical resistance is reached. A pure semi-conducting connection can be achieved by burning away metallic nanotubes that may be part of the carbon nanotube mixture, by applying a current after the deposition. The polymer matrix is cured in order to fix the device.

This account is limited to carbon nanotubes and addresses the problem in microelectronics and circuit boards. The electrode-electrode contacts in a microelectronic circuit board are point like or nearly point like and thus cover only small volumes and only low currents pass in the CNT connections. The carbon nanotubes are difficult to produce on an industrial scale and are expensive and applications involving larger volumes are not realistic today. CNTs are, moreover, difficult to mix with polymers to form high quality dispersions.

IV. UV Polymer

UV curing of polymers and polymer systems is generally beneficial because
1. it allows ultimate control of shelf life and pot life
2. it is fast
3. it can be applied where heat would cause damages UV curing is widely used in the area of polymers and in particular adhesive polymers. Conductive polymer composites and adhesives are materials that comprise a polymer matrix and conductive fillers that make the material conductive. The particle fraction needs to be so high that the conductive particles form pathways through the material. Typically this means tens of volume percentages.

It is however difficult to prepare industrially useful UV curable conductive polymer composites since high fraction of conductive particles absorb incoming UV light, which makes the curing inefficient. Material with high particle fraction has stronger tendency to the segregation of particles and matrix than material with low particle fraction. Segregation limits the storage time of material. Segregated material may not be used or requires careful and inconvenient mixing procedures before the use.

U.S. Pat. No. 5,932,339 describes an an anisotropically electricity-conductive film obtainable by dispersing in an adhesive agent electrically conductive particles, the adhesive agent being a curable adhesive agent comprising as a major component at least one polymer selected from the group consisting of an ethylene-vinyl acetate copolymer; a copolymer of ethylene, vinyl acetate and an acrylate and/or methacrylate monomer; a copolymer of ethylene, vinyl acetate and maleic acid and/or maleic anhydride; a copolymer of ethylene, an acrylate and/or methacrylate monomer and maleic acid and/or maleic anhydride; and an ionomer resin wherein molecules of an ethylene-methacrylic acid copolymer are linked with each other through a metal ion. It is mentioned that the film may be made UV curable.

U.S. Pat. No. 5,769,996 concerns compositions and methods for providing anisotropic conductive pathways between two sets of conductors which comprises forming said pathways with a plurality of electrically conductive particles having substantially uniform sizes and shapes, said electrically conductive particles having been arrayed in a regular pattern by application of a substantially uniform magnetic field.

U.S. Pat. No. 5,328,087 concerns a thermally and electrically conductive adhesive material comprising a hardened adhesive, and a non-solidified filler containing a liquid metal dispersed in separate spaced regions of the adhesive. The hardened adhesive provides a mechanical bond whereas the filler provides continuous thermal and electrical metal bridges, each bridge extending through the adhesive and contacting the bonded surfaces. The method includes dispersing a filler containing a liquid metal into an unhardened adhesive, contacting the unhardened adhesive and the filler in non-solidified state to the surfaces resulting in separate spaced regions of the non-solidified filler contacting both surfaces, and lastly hardening the adhesive in an example this system is used with UV curable adhesive.

SUMMARY OF THE INVENTION (I) Production

The invention provides for a method for forming an anisotropic conductive body, such as a film, or mat, comprising a matrix mixed with conductive particles and subsequent stabilization of the matrix. Both thermal conductivity and electrical conductivity is described herein by the terms conductive and conductivity.

The term film includes free-standing film, below 1 cm, made of one or more layers, comprising one or more conducting layer of the present invention. The term film also includes a thin layer attached to at least one substrate, used to make e.g. the surface of a body conductive, or to make a conductive layer within a laminate. If the film is made from an adhesive polymer, the present invention can be used as conductive glue. Films can also be used for making electrostatic discharge (ESD) devices.

The term mat includes structures above 1 cm of thickness made of one or more layers, comprising one or more conducting layer of the present invention. The term mat also includes a layer attached to at least one substrate, used to make e.g. the surface of a body conductive, or to make a conductive layer within a laminate. If the mat is made from an adhesive polymer, the present invention can be used as conductive glue.

The conductive particles are infusible conductive particles such as carbon particles, metal or metal oxide particles. The conductive particles show low molecular or particle anisotropy and thus the major part of the conductive particles has low aspect ratio; aspect ratio ranges of 1-4, or 1-5, 1-10 or 1-20 are typical. The terms "low molecular or particle anisotropy" and "low aspect ratio" has the same meaning herein. This is the case with spherical carbon black (CB) or disk-like or conical carbon particles here referred to as carbon nanocones (CNC). The conductive particles can be a mixture of different carbon particles. Also other conductive particles can be used, like metal, such as silver or metal oxide particles or colloidal metal particles.

The matrix can be a polymer system of any kind and it can contain one or several components. In particular, it can be a thermoset polymer system which means that the matrix is originally fluid but can be solidified by cross-links. This polymer can be an adhesive. It can also be a thermoplastic polymer system which means that the polymer is solid or viscous at lower temperatures but can be reversibly melted or plasticised by rising the temperature. It can moreover be a lyotropic polymer system which means that the polymer matrix can be plasticised by solvent and solidified by evaporating this solvent off. It can also be any combination of these systems. For example, the thermoset polymer system can contain solvent for plasticizing it but the stabilization can be based primarily on cross-linking and only secondarily on the solvent evaporation.

The adhesive can be ultraviolet light (UV) curing adhesives, also known as light curing materials (LCM). UV curing adhesives have rapid curing time and strong bond strength. They can cure in as short times as a second and many formulations can bond dissimilar materials and withstand harsh temperatures. These qualities make UV curing adhesives essential to the manufacturing of items in many industrial markets such as electronics, telecommunications, medical, aerospace, glass, and optical. Unlike traditional adhesives, UV light curing adhesives not only bond materials together but they can also be used to seal and coat products.

When exposed to the correct energy and irradiance in the required band of UV light, polymerization occurs, and so the adhesives harden or cure. The types of UV sources for UV curing include UV lamps, UV LEDs and Excimer Flash lamps.

Laminates can be built up with successively applied UV cured layers. This obviates the need for adhesive or primer layers. Thin layers can be formed in very short time, in the range of one second. There are a wide variety of UV curable vinyl monomers, particularly acrylics, with a wide variety of properties that can be combined by means of copolymers or laminates. For example strong acrylics can be combined with the fracture resistant acrylates. Acrylics could be combined with intermediate layers of cross-linked elastomers for maximizing tear strength while retaining surface hardness. Certain fluoracrylates are hard, and antireflective. They have higher specular transmission than a commonly used fluoropolymer, because fluoroacrylates can be completely amorphous and have no scattering centers. Epoxy resins have tightly linked adhesive polymer structures and can be used in surface adhesives and coatings. Such epoxy resins forms cross-linked polymer structures that have strong adhesion and low shrinkage.

There are many systems available for UV curing an adhesive, coating or film. The Dymax Heavy-Duty UV curing Widecure™ Conveyor Systems is an example of a system mounted on a conveyor belt. Dymax BlueWave LED Prime UVA used LED light and thus use less effect and have constant high intensity.

An element of the invention is that conductive paths can be formed of predominantly low aspect ratio particles like CB or CNC particles and the formation can take place at low electric field strengths. This simplifies the production equipment and enables both larger surfaces and thicker films to be produced. The CB and CNC particles are considerably cheaper than the carbon nanotubes and can be produced in sufficient quantities by industrial methods. Moreover, it is more difficult to form uniform dispersions with carbon nanotubes than CB and CNC.

Another element of the invention is that formation of conductive paths can take place at low electric field strengths. This simplifies the electric equipment and the handling of films and substrates. This means that no specific safety aspects related to the high voltages are required.

The electric field can be in the order of 0.01-20 kV/cm or 0.1-5 kV/cm, or 0.1 to 1 kV/cm. This means that for alignment distance in the range of 10 micrometer to 1 mm the voltage applied can be in the range of 10-2000 V. The field is an alternating (AC) field. A typical field is an AC field has a frequency of 10 Hz to 10 kHz. High frequencies >1 kHz are required for the smaller particle size <1 micrometer. Direct (DC) electric field or very low frequencies <10 Hz lead to asymmetric chain formation and build up, which can nevertheless conduct current.

The direction of the electric field can be predetermined by the electrode arrangement and thereby the direction of the electric connections formed by the aligned conductive particles can be controlled.

It is also possible to heal aligned conductive particle pathways; if the conductive pathways have become defect or not properly aligned in the first step, the alignment step can be rerun for the case that the stabilization step of the matrix is not yet performed or if the stabilization step is reversible. This has the advantage that for existing films under preparation of the connections the process need not to be started afresh.

The manufacturing of anisotropic conductive films does not require that the film forming polymer-particle mixture is in contact with the electrodes. The manufacturing process can be conducted in a continuous way or step-wise. The anisotropic film can be attached to a substrate or be a free-standing film; or it can be attached to one electrode, thus forming a semi-free-standing film. The electric field can be created between electrodes that can be placed either in direct contact with one or both sides of the polymer film layer or outside additional insulating layers, where the insulating layers are placed either in direct contact with the film layer or not.

Another element of the invention is that the concentration of conductive particles may be low. For conductive mixtures a percolation threshold is defined as the lowest concentration of conductive particles necessary to achieve long-range conductivity in the random system. In a system formed by a method according to the invention the concentration of conductive particles necessary for achieving conductivity in a predefined direction is not determined by the percolation threshold and the concentration can be lower. For practical reasons the concentration of particles is determined by the requirements on the conductive paths, there usually being no reason to have excess amounts of conductive particles not arranged into the conductive paths. The concentration of conductive particles in the polymer matrix could be up to 10 times lower than the percolation threshold or even lower. Concentrations of conductive particles may be in the range of 0.2-10 vol %, or 0.2-2 vol %, or 0.2-1.5 vol %.

This has several advantages in that mixtures having only small amounts of conductive particles are less prone to macrophase separation and are thereby easier to store. Also the mechanical strength of the anisotropic conductive film is increased if the amount of particles can be reduced. For UV cured films the curing process is more effective when the amount of particles which may shield the UV light is lower. Likewise the transparency of a film can be increased if the amount of particles can be reduced. A lower amount of conductive particles is also a cost-saving element.

In an embodiment additional steps to remove most or the entire matrix after alignment to yield distinctive, aligned molecular wires of the conductive particles are made. The removal can be done for example by excess heating (e.g. pyrolysis) or by chemical treatment (e.g. selective solvent).

In another embodiment the formation of conductive paths is performed directly on an electrode in order to increase the surface structure of the electrode.

The use of the present invention includes: electrostatic discharge (ESD) devices, conductive glue and adhesives for use in solar panels and electronics. Advantages include a low fraction of conducting material in the matrix, as conductivity is achieved below the percolation threshold and this gives mechanical and optical properties closer to that of the used polymer without the conductive particles. Also the process of applying an electrical field and using UV curing is easy to add to an existing manufacturing process, so that using the present invention as a conductive adhesive can be done an amendment to an existing production line.

II. Electrostatic Discharge

The invention provides for a method for forming an anisotropic conductive or dissipative film comprising a nonconductive matrix mixed with conductive particles.

The present invention may be used both in a device, film or adhesive to t avoid buildup of electrostatic charges and for a device which safely discharges if a person or object has been electrostatically charged.

The conductive particles are infusible particles such as carbon particles or metal particles. The conductive particles show low molecular or particle anisotropy which is the case with spherical carbon black or disk-like carbon particles. The major part of the conductive particles thus has low aspect ratio; aspect ratio ranges of 1-4, or 1-5, 1-10, 1-20 or 1-100 are typical. The conductive particles can be a mixture of different carbon particles. Also other conductive particles can be used. Metal, like silver, or metal oxide particles can be used.

The matrix can be a polymer system of any kind and it can contain one or several components. In particular, it can be a thermoset polymer system which means that the matrix is originally fluid, but can be solidified by cross-links. This polymer can be an adhesive. It can also be a thermoplastic polymer system which means that the polymer is solid or viscous at lower temperatures but can be reversibly melted or plasticised by increasing the temperature. It can moreover be a lyotropic polymer system which means that the matrix can be plasticised by solvent and solidified by evaporating this solvent off. It may then have a high percentage of filler material with low price, usable for production of large volume ESD devices, such as floor tiles. It can also be any combination of these systems. For example, the thermoset polymer system can contain solvent for plasticizing it but the stabilization can be based primarily on cross-linking and only secondarily on the solvent evaporation.

An element of the invention is that conductive paths can be formed of low molecular anisotropic particles like carbon black and disc like carbon particles at low electric field strengths. This simplifies the production equipment and enables both larger surfaces and thicker films to be produced. The carbon black and disc like carbon particles are considerably cheaper than the carbon nanotubes (CNT) and can be produced in large quantities by industrial methods.

Another element of the invention is that the amount of conductive particles may be below the percolation threshold. This has several advantages in that mixtures having only small amounts of conductive particles are less prone to macrophase separation and are thereby easier to store. Also the mechanical strength of the anisotropic conductive film can be increased if the amount of particles can be reduced. For UV cured films the curing process is more effective when the amount of shielding particles is lower. Likewise the transparency of a film can be increased if the amount of particles can be reduced. A lower amount of conductive particles is also a cost-saving element.

The electric field can be created between electrodes that can be placed either in direct contact with one or both sides of the layer or outside additional insulating layers, where the insulating layers are placed in contact with the first layer; or that may not be in direct contact with the layer.

The direction of the electric field can be predetermined by the electrode arrangement and thereby the direction of the electric connections formed by the aligned conductive particles can be controlled.

The ESD degree can be controlled in the production, by varying factors such as the particle mix and the field. The electric field can be in the order of 0.01 to 35 kV/cm, in the order of 0.05 to 20 kV/cm, or 0.05 to 5 kV/cm or 0.1 to 1 kV and especially in the order of 0.1-1 kV/cm.

This means that for a typical alignment distance in the range of 10 m to 1 mm, the voltage applied can be in the range of 0.1 to 100 V. The field is an alternating (AC) field, but can also be a direct (DC) electric field. A typical field is an AC field having a frequency of 10 Hz to 100 kHz, typically 10 Hz to 10 kHz. Very low frequencies <10 Hz or DC fields lead to asymmetric chain formation and build up. The low voltage needed for applying the method is simple to handle in a production line and does not need the specific arrangements necessary when handling high voltages.

Thus, the present invention is based on the finding that it is possible to align conductive particles in fluid-like polymer matrices using an electric field to form conductive pathways in the fluid-like polymer matrices. The pathways are able to enhance the macroscopic conductivity of the material. In particular, the formation of conductive pathways allows the material to become conductive also when it contains a lower amount of conductive particles than is otherwise necessary for creating electrical contact for the material having randomly distributed particles. The amount of conductive particles in the polymer matrix could thereby be reduced and can be up to 10 times lower than the percolation threshold, or even lower.

Moreover, this procedure renders anisotropic material and directional conductivity that is higher along the alignment direction than perpendicular to it.

It is also possible to heal aligned conductive particle pathways, if the conductive pathways have become defective or not properly aligned in the first step, the alignment step can be rerun for the case that the stabilization step of the matrix is not yet performed or if the stabilization step is reversible. This has the advantage that for existing films under preparation of the connections, the process needs not to be started afresh.

It is possible to remove most or all the matrix after alignment to yield distinctive, aligned molecular wires of the conductive particles. The removal can be done for example by excess heating (e.g. pyrolysis) or by chemical treatment (e.g. selective solvent).

The manufacturing of anisotropic conductive films does not require that the film forming resin is in contact with the electrodes. The manufacturing process can be conducted in a continuous way or step-wise. The anisotropic film can be attached to a substrate or be a free-standing film.

A conductive film of the present invention will have conductive pathways and thus may be used as an electrical current collector and connect to other films, which could be conductive or non-conductive. As electron flow can be unidirectional or bidirectional, the present invention can be used as anode or cathode in batteries or capacitors. The film can be laminated to other material by a heat lamination process, heat sealed to another non-conductive polymer, or laminated using a conductive binder. Another use is as a barrier to block electrolyte transfers or as a replacement for any battery metalized electrode conductor in electrolyte solutions of any sort.

In an embodiment of the invention the resin is removed fully or partly from the film after the anisotropic conductive film has been manufactured and a substrate with free standing conductive paths is achieved.

In another embodiment the polymer is used as an adhesive or in a lamination process.

III. Solar Cell

Solar cells generally have surface electrodes, tabs, printed on a substrate of at least one or more single-crystal, polycrystal or amorphous materials. The solar cell busbars shall connect to the tabs for connection between the solar cells. A conductive adhesive layer can be used for the connection.

Interconnections between solar cell tabs and busbars in solar cell modules cover large areas. The adhesive used for the interconnection must achieve a good mechanical bonding as well as electrical conductivity between the solar cell tabs and busbars. It is an advantage if the adhesive can be made from conventional materials that are available on an industrial scale.

The invention concerns an interconnection between solar cell tabs and busbars formed by an adhesive comprising a low concentration of conductive particles. The conductive particles can be infusible particles such as carbon particles, metal particles or metal oxide particles. The adhesive is made conductive by applying an electric field over the adhesive when the adhesive is placed between the solar cell tabs and busbars. The adhesive is thereafter stabilised.

The anisotropic adhesive conductive film formed by the application of the electric field and the following stabilisation allows the adhesive to have electric conductive properties at lower concentrations of conductive particles than would otherwise be possible for isotropic conductive adhesives. The lower concentration of conductive particles gives improved mechanical properties to the adhesive and the alignment of the conductive particles taking place when the electric field is applied secures the electrical conductivity of the adhesive film between the solar cell tabs and busbars.

There are no particular restrictions on the adhesive matrix component. The adhesive is a mixture of a matrix and conductive particles. The mixing can be made by conventional means. A low concentration of conductive particles gives the adhesive good storing properties and thereby makes the adhesive simple to handle in an industrial environment.

The matrix can be an adhesive polymer system of any kind and it can contain one or several components. The adhesive will be stabilised after an alignment step to a second viscosity higher than the first viscosity in order to make the adhesive mechanically stable and to support the aligned conductive particles. In particular, the matrix can be a thermoset polymer system which means that the matrix is originally fluid but can be solidified by cross-links. It can also be a thermoplastic polymer system which means that the polymer is solid or viscous at lower temperatures but can be reversibly melted or plasticised by rising the temperature. It can moreover be a lyotropic polymer system which means that the matrix can be plasticised by solvent and solidified by evaporating this solvent off. It can also be any combination of these systems. For example, the thermoset polymer system can contain solvent for plasticizing it but the stabilization can be based primarily on cross-linking and only secondarily on the solvent evaporation.

The major part of the conductive particles has low aspect ratio, like spherical carbon black or disk- or cone like carbon particles. Aspect ratios range of 1-4, or 1-5, 1-10, 1-20 or 1-100 are typical; i.e. a ratio 1:N where N is greater than or equal to 4 and can be as high as 100 or more. The conductive particles can be a mixture of different carbon particles. Other conductive particles can be used, like silver, gold or metal oxide particles.

Carbon black and carbon nano-discs and cones as well as metal or metal oxide particles are produced on an industrial scale and are thus available for applications involving larger volumes.

The concentration of conductive particles in the matrix can be held low without adverse effects on the conductivity. A concentration around the percolation threshold and up to ten times lower can give good conductivity after the alignment step. Concentrations in the range of 0.2 to 10 vol %, or 0.2 to 2 vol % or 0.2 to 1.5 vol % of conductive particles are useful.

Application of the adhesive can be done by conventional printing or injection techniques, which makes it possible to apply the adhesive to large surfaces in a cost-effective manner. The adhesive has a first viscosity during the application, which shall be low enough that the conductive particles shall be able to move during the subsequent alignment step.

The electric field can be in the order of 0.05 to 10 kV/cm, or 0.05 to 5 kV/cm or 0.1 to 1 kV/cm. This means that for a typical alignment distance in the range of 10 m to 1 mm, the voltage applied can be in the range of 0.05 to 1000 V and normally in the range of 5-100 V. The field is typically an alternating (AC) field, having typically a frequency of 10 Hz to 10 kHz. A direct (DC) electric field can also be used. The voltage levels needed for aligning the conductive particles are low and make the process simple to handle in a production line and do not need the specific arrangements necessary when handling high voltages.

The direction of the electric field is perpendicular to the surfaces of the solar cell tabs and busbars and the electric connections formed by the aligned conductive particles make up a number of conductive paths along the direction of the electric field and thereby connecting the solar cell tabs and busbars.

The electrical field can be applied during lamination with the adhesive of the present invention, both for backside contact solar cells and standard solar cells. Once the solar cells are placed in the glass with encapsulation foil, typically EVA (ethylene vinyl-polymer acetate) and backsheet. The external electrical field is applied in the laminator.

It is also possible to heal aligned conductive particle pathways, if the conductive pathways have become defect or not properly aligned in the first step, the alignment step can be rerun for the case that the stabilisation step of the matrix is not yet performed or if the stabilization step is reversible. This has the advantage that for existing films under preparation of the connections the process need not to be started afresh. The stabilisation step may be, e.g., curing of a thermoset polymer.

IV. UV Polymer

It is an object of the present invention to provide a polymer composition, such as an adhesive polymer composition, that is UV curable and that is able to produce electrically conductive layers.

It is a further object of the invention that the polymer composition is also able to produce thermally conductive layers.

It is also an object of the present invention to provide an adhesive polymer composition which is curable with UV light to provide an anisotropic electrically conductive layer and which, when stored in a manner in which exposure to UV light is prevented, exhibits excellent shelf life.

It is an object derived from said first object to provide a method for producing such an adhesive composition for storage and subsequent use.

It is a further object to provide the aforesaid method and adhesive composition with inexpensive means for industrial scale applications.

BRIEF DESCRIPTION OF THE DRAWINGS

FIG. 18 C shows the applied geometry of joint electrodes (a) and adhesive with aligned pathways (b).

DETAILED DESCRIPTION OF THE PREFERRED EMBODIMENTS

Figure 1:
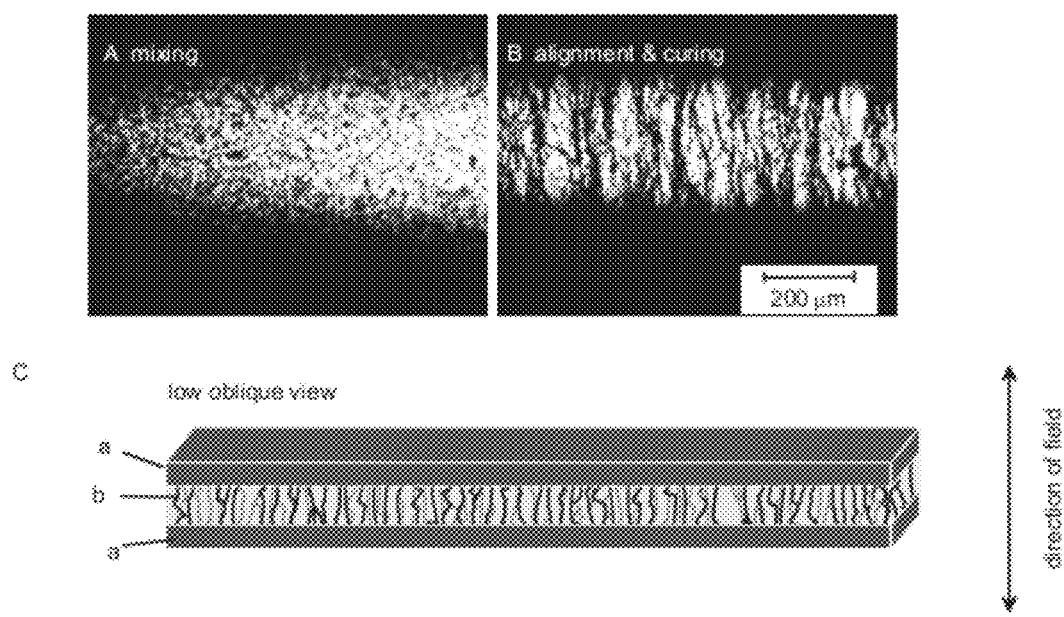
FIG. 1 show optical micrographs of assemblies of 0.2 vol-% CNC particles dispersed into the adhesive (A) and aligned by the electric field (B) as well as the schematic of the situation (C).

The present invention will be described below with reference to examples and figures. It is to be understood that the present invention is by no means limited to these examples and figures.

I. Production

The method can be used in a production line for ESD (electrostatic dissipation or discharge, also known as antistatic) devices, such as films for antistatic packaging or antistatic mats or boards. A thermally conductive film can also be made, that can e.g. be used for lighting reflectors or electronic parts, or a thermally conductive mat that e.g. can be used for form a heat sink. The method comprises the following steps:

i. a matrix is formed from epoxy mixed with conducting particles, according to the present invention
ii. the matrix is applied to a substrate e.g. by spraying, pouring or dipping
iii. an electrical field in the range of 0.01 to 20 kV/cm is applied
iv. the matrix is cured, using e.g. UV light or heat
v. optionally the matrix is reduced, so as to expose the conducting pathways
vi. optionally steps ii to v is repeated to create several layers, e.g. for creating conductive pathways in different directions.

The method can also be used in a production line for e.g. solar cells or electronics. The method comprises the following steps:

i. epoxy is mixed with conducting particles to form a matrix with conducting particles
ii. the matrix is applied between surfaces that shall be electrically and mechanically connected
iii. an electrical field in the range of 0.01 to 20 kV/cm is applied over the matrix
iv. the matrix is cured, using e.g. UV light or heat.

Example 1

This example concerns the preparation of a mixture of conductive particles and polymer matrix that in this example is an thermally cured polymer adhesive; as well as determination of conductivity as a function of particle load; and how the step-like increase in conductivity with increasing particle load can be explained by formation of conductive paths between particles when the contacts are formed with increased particle fraction.

This example concerns moreover the preparation of the same mixture when the particle load is low, for example 10 times less than the observed percolation threshold, the limit where the isotropic non-aligned mixture is not conductive; as well as the alignment of this mixture using electric field so that the aligned particles form conductive paths resulting in a conductive material, whose conductivity is directional. The example, moreover, shows change of the viscosity of so obtained material, by curing, so that the alignment and directional conductivity obtained in the alignment step is maintained.

The employed conductive particles were CB from Alfa Aesar, CNC from n-Tec AS (Norway) and iron oxide (FeO.Fe$_2$O$_3$) from Sigma-Aldrich.

The employed polymer matrix was a two component low viscosity adhesive formed by combining Araldite® AY 105-1 (Huntsman Advanced Materials GmbH) with low viscosity epoxy resin with Ren® HY 5160 (Vantico AG).

The conductive particles were mixed in the adhesive by stirring for 30 minutes. Due to the high viscosity of mixture, efficient mixing is possible only up to 20 vol-%. of particles.

Estimated percolation threshold of these materials are at ~2 vol-%. The mixtures are conductive above and insulators below this threshold. The conductivity is due to the conductive particles and the polymer is essentially insulator.

To illustrate the benefit of alignment, the particle loads of 1/10 of the estimated percolation threshold were used.

FIG. 1 illustrates, using optical micrographs, the mixing of assemblies of 0.2 vol-% CNC particles dispersed into the example adhesive before (FIG. 1A) and after an electric field alignment and curing (FIG. 1B).

The scheme shows the applied alignment (out-of-plane) geometry (FIG. 1C). This alignment geometry was used to cover conductive path distances from 10 µm to 2 mm. For an out-of-plane alignment 2 mm×3 cm wide layer of material is injected between two metal electrodes with spacing of ≤2 mm.

Mixture was aligned using an AC source. In this example the alignment procedure 1 kHz AC-field (0.6-4 kV/cm, rms value) was employed for >10 minutes for >1 mm electrode spacing and <10 minutes for <1 mm electrode spacing.

Figure 2:
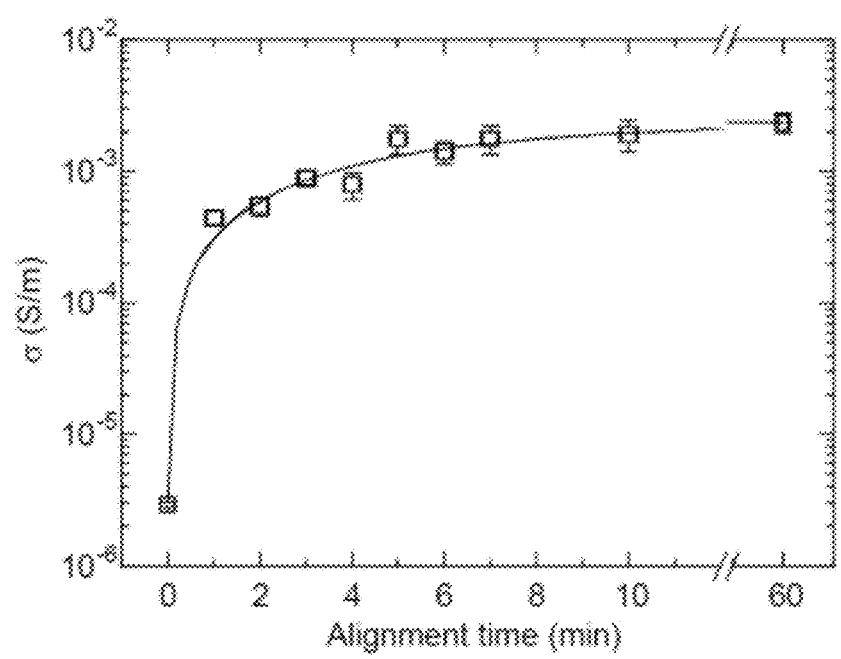
FIG. 2 shows a plot of the dependence of DC conductivity of 0.2 vol-% CNC particles dispersed into the adhesive against the alignment time. The solid line is guide to the eye.

FIG. 2 shows the conductivity as a function of alignment time illustrating orders of magnitudes conductivity enhancement.

The curing was performed immediately afterwards at 100° C. for 6 minutes.

The material remains aligned after curing and conductivity level obtained by alignment is maintained.

Example 2

This example concerns versatile choice of alignment conditions and illustrates how the present invention can be employed not only with electrodes connected to the orientation material but also with electrodes electrically isolated from the material.

The procedure was otherwise similar to that in example 1, but instead of having material directly connected to the alignment electrodes, the electrodes were electrically disconnected from the material by an insulating layer, for example by 0.127 mm Kapton® foils. Alignment occurred exactly as in Example 1.

Figure 3:
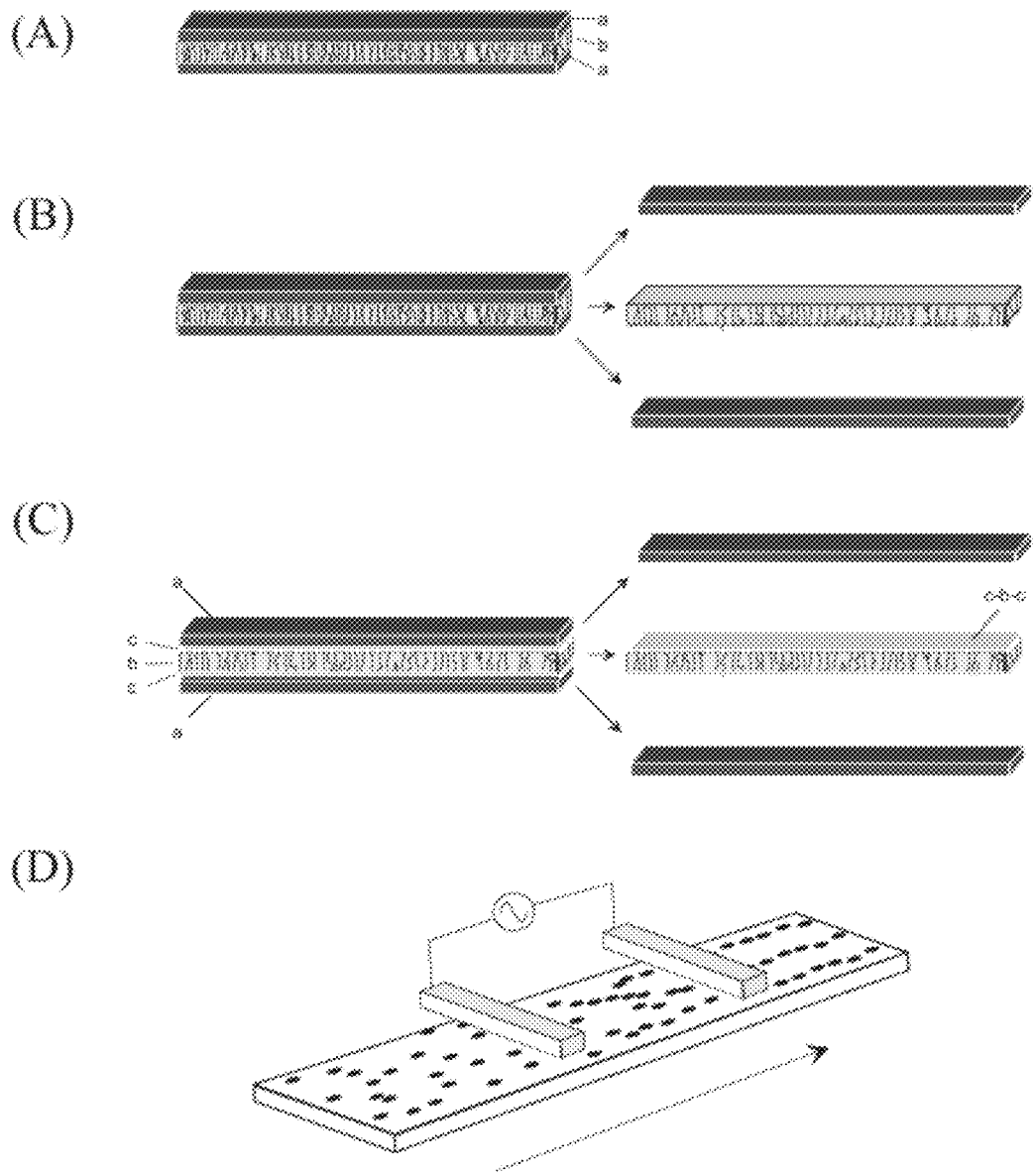
FIG. 3 shows aligned film with (A-B) and without (C-D) electrical contacts between electrodes.

This procedure allows removal of electrodes after alignment and thus freestanding aligned film even in the case where the matrix is adhesive. The alignment also occurs if the electrodes do not touch the material and so the alignment can be performed from the distance. When the material and electrodes are moved, continuous or stepwise, with respect to each others during the alignment, this allows continuous alignment processing. Three possible options for the alignment settings are illustrated in FIG. 3 that shows aligned film with (A-B) and without (C-D) electrical contacts between electrodes (a) and material (b). In the case (A) the aligned film forms permanent connection between the electrodes. In the case (B) the electrodes and material are only loosely joined together and can be moved apart after alignment. In the case (C) there are insulating layers (c) between the material and electrodes and they are easily moved apart after the alignment even in the case where the material is an adhesive. In this case the obtained material is a multilayer consisting of aligned layer (b) and two insulating layers (c) In the case (D) the alignment is carried out from the distance and the mutual location of electrodes and film can be additionally moved during the alignment.

Example 3

This example concerns the applicability of the alignment method, the use of alignment for particular application of UV-curing. This emphasises the benefit of low particle fraction which makes the material more transparent for UV light for curing.

The procedure was otherwise similar to that in example 1 or 2 but the thermally cured polymer matrix was replaced by UV-curable Dymax Ultra Light-Weld® 3094 adhesive and the curing step was done by the UV-light with the wavelength 300-500 nm.

Figure 4:
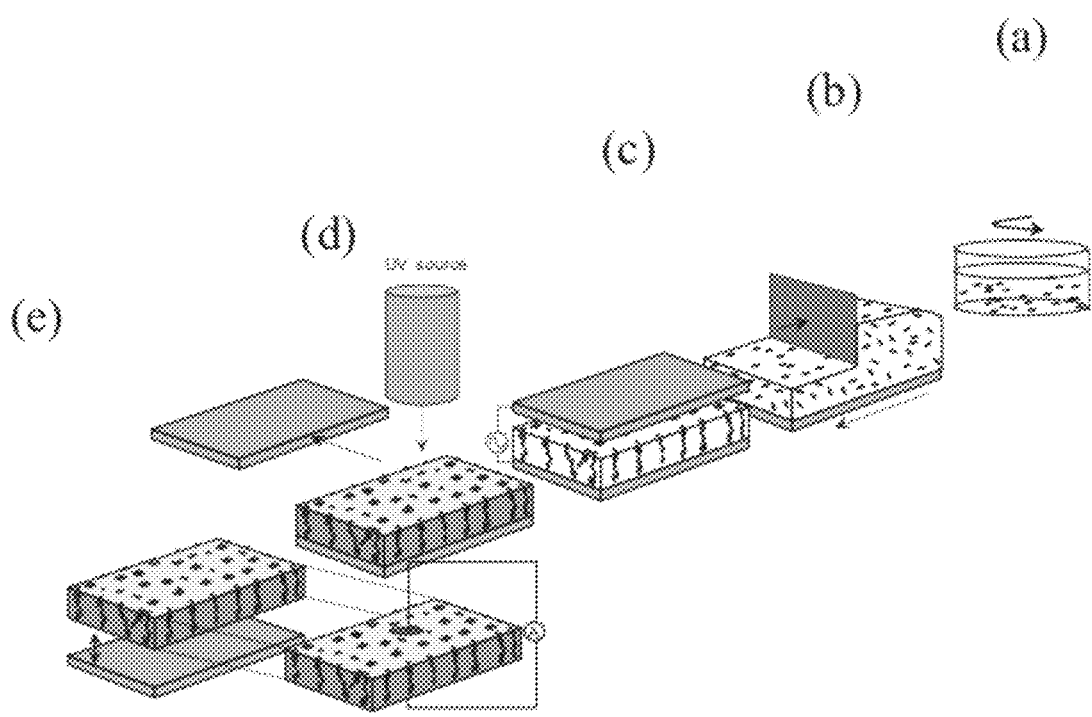
FIG. 4 shows schematics of the UV curing technique.

FIG. 4 illustrates the alignment of 0.2 vol-% CNC dispersion in out-of-plane geometry. The mixture was formed following the guideline of example 1 (FIG. 4a) but spread on the alignment electrode using RK Print Paint Applicator that uses a moving bird applicator to level the adhesive layer to the predetermined thickness (the idea is schematically illustrated in FIG. 4b). This admixture was aligned following the method outlined in example 2 but the upper electrode was not in contact with the material by use of an insulating layer such as Kapton (FIG. 4c); this allows removal of electrodes after alignment and thus freestanding aligned film even in the case where the matrix is adhesive. After alignment, the upper alignment electrode is removed and aligned admixture cured by UV or blue light. (FIG. 4d). The lower electrode can be optionally removed (FIG. 4e) to form a fully freestanding film.

FIG. 4 also gives the schematics of UV curing. Conductive particles are dispersed with UV-curable polymer matrix (a). This mixture is spread to form a predetermined layer on the substrate (that acts also as an alignment electrode) using an applicator (b). The material is aligned by electric field using lower electrode and another top-electrode that does not touch the material (c). The upper electrode is removed and the aligned mixture is cured using a light (UV/vis) source, which leads to a semi-freestanding aligned film (d). If required, the lower electrode can be additionally removed leading to a fully free-standing aligned film (e).

Example 4

This example shows how the present invention can be employed with thermoplastic or thermotropic polymer matrix.

The procedure was otherwise similar to that in Example 1 or 2 but thermoplastic or thermotropic polymer is used instead of thermoset polymer. In this example alignment was performed when the material was fluid at elevated temperature above the melting point of material. Permanent alignment was achieved when the temperature of fluid matrix with aligned particles was decreased below its glass transition or melting point, which resulted in the stabilization of material.

The used matrix material was polyfluorene polymer (American Dye Source, with melting point at 180° C.)

Example 5

This example illustrates how the invention can be employed with polymer matrix and co-solvent.

The procedure was otherwise similar to that in examples 1, 2, 3, or 4 but the polymer matrix contains solvent. The alignment was performed with the presence of solvent and the solvent was evaporating off after alignment. This can occur with or without curing of thermoset polymer or cooling thermoplastic or thermotropic polymer.

In the case of thermoset polymer matrix this solvent decreases the viscosity of matrix polymer. This means that the solvent acts as thinner. An example solvent in the thermocured polymer in example 1 is benzylalcohol that is a good solvent for epoxy resin and hardener.

In the case of thermoplastic or thermotropic polymer matrix in example 1 this solvent makes the mixture fluid already below the melting point of matrix and allows thus alignment at lower temperature. A possible solvent in example 4 is toluene that is a good solvent for polyfluorene.

Example 6

This example shows the robustness of the procedure and shows how electric field heals macroscopic defects in a conductive particle adhesive mixture.

Figure 5:
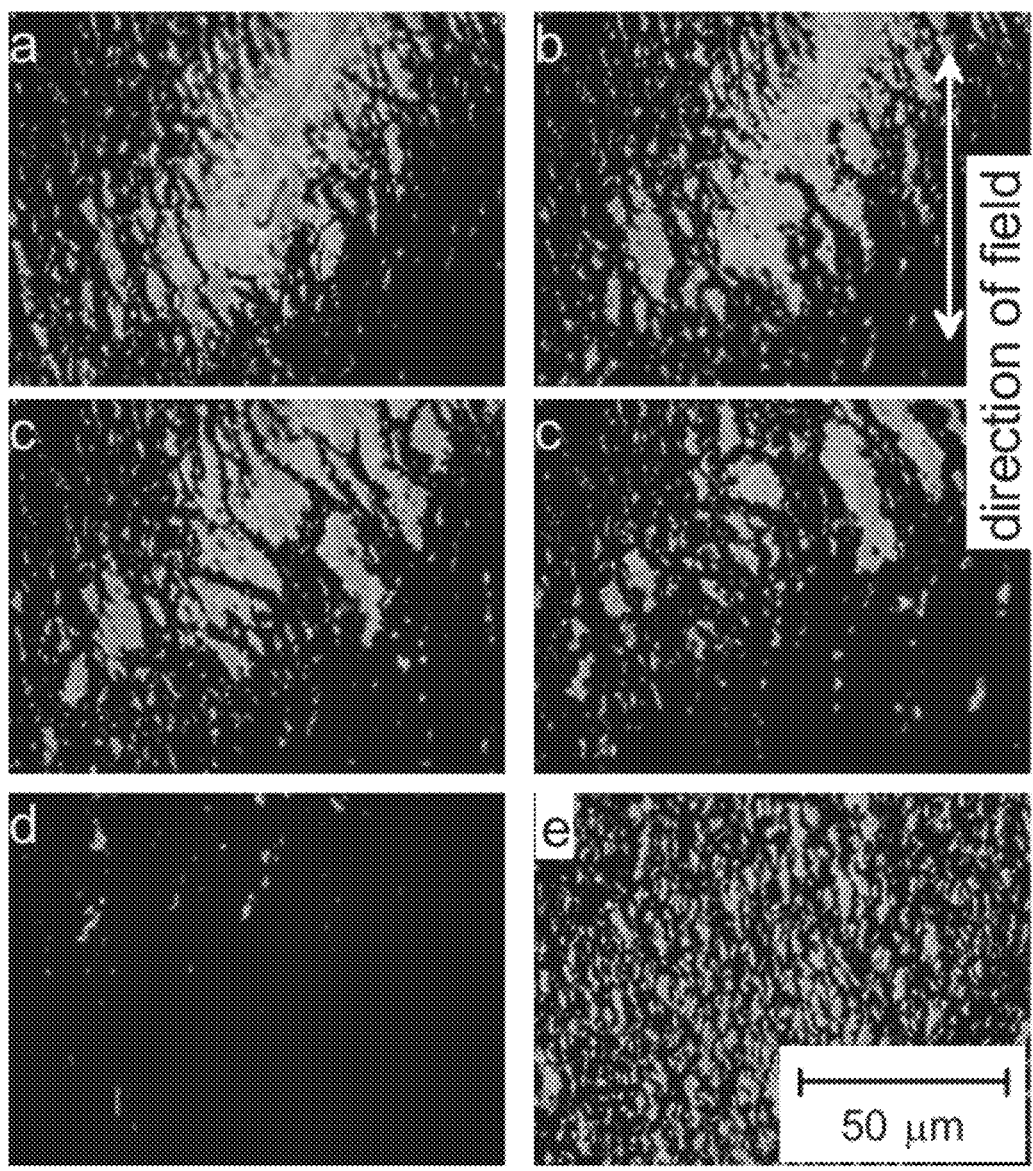
FIG. 5 shows optical micrographs showing the healing of a scratch.

The materials and procedure was similar to that in examples 1, 2, 3, 4, or 5, but a macroscopic scratch defect was made by a sharp spike; and the electric field was reapplied. FIG. 5 *a-e* are optical micrographs showing the healing of the scratch in the case of CNC particle mixture.

Example 7

This example concerns versatile choice of alignment geometries and illustrates how the invention can be employed not only in the geometry shown in Example 1 but also in (i) thin films and (ii) in-plane geometry. This example underlines the generality of the method.

The material was the same and the procedure similar as in Example 1, but instead of out-of-plane alignment geometry, in-plane alignment geometry was used.

For the in-plane alignment ~10 µm thick layer was spread either by spin-coating or by plastic spatula over 1 cm×1 cm area of metal finger grid where the thickness and width of fingers, respectively, were 50-200 nm and 2-10 µm. The spacing between fingers was 10-100 µm.

Figure 6:
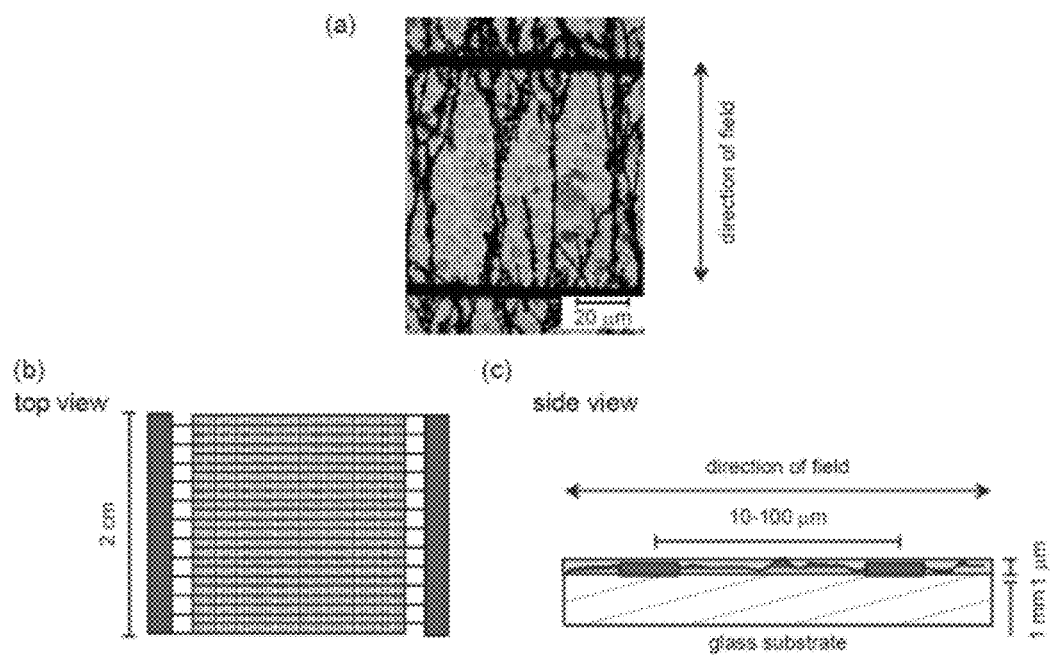
FIG. 6 a-c shows aligned and cured conductive particle polymer system in in-plane geometry.

FIG. 6 illustrates aligned and cured conductive CNC adhesives in in-plane geometry. FIG. 6*a* shows an optical micrograph 0.2 vol-% aligned material. Schematic (FIG. 6*b*) illustrates the alignment setting. In this geometry the alignment occurs typically in seconds or tens of seconds.

In another version the alignment electrodes were electrically insulated for example by $SiO_2$ layer following the idea of example 2. Alignment was achieved exactly as without insulating layer.

Example 8

This example concerns versatile choice of alignment geometries and illustrates how the invention can be employed not only in the out-of-plane and in-plane geometries with flat well defined electrodes but also when the geometry and electrode shape is arbitrary. This example underlines the generality of the method. This also illustrates that the alignment does not require a surface or interface parallel to the emerging aligned pathways.

Figure 7:
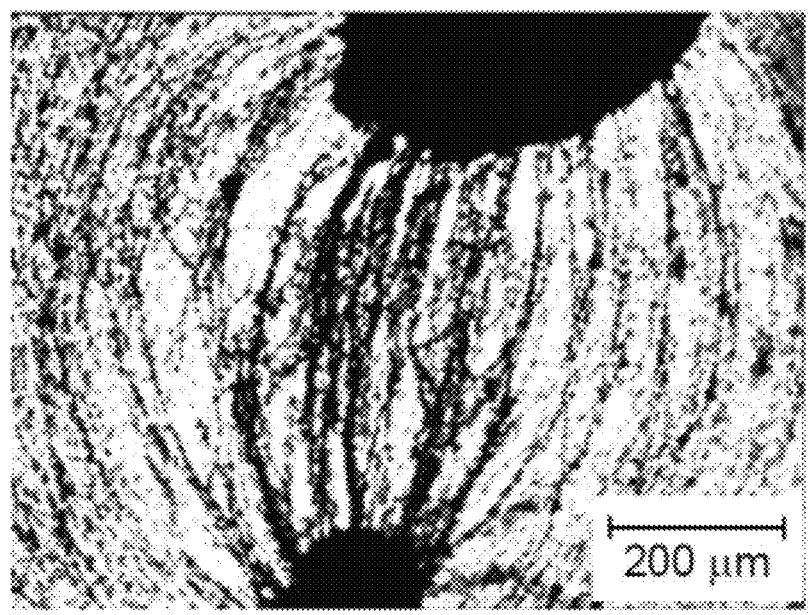
FIG. 7 shows aligned material with arbitrary alignment geometry and arbitrary electrode shape.

The materials were otherwise the same and the procedure similar as in Example 1, 2, 3, 4, or 5 but instead of out-of-plane or in-plane alignment geometry and flat electrodes, arbitrary geometry and arbitrary electrode shape were used. FIG. 7 shows an optical micrograph of aligned material when arbitrary geometry and arbitrary electrode shapes have been used.

Example 9

This example concerns another feature of the invention, the reduction of matrix after alignment and stabilization. This illustrates how the present invention can be employed in (i) thin films and (ii) in-plane geometry so that the outcome forms solitary network of aligned pure conductive particles or aligned channels with conductive core and insulating mantle.

Figure 8:
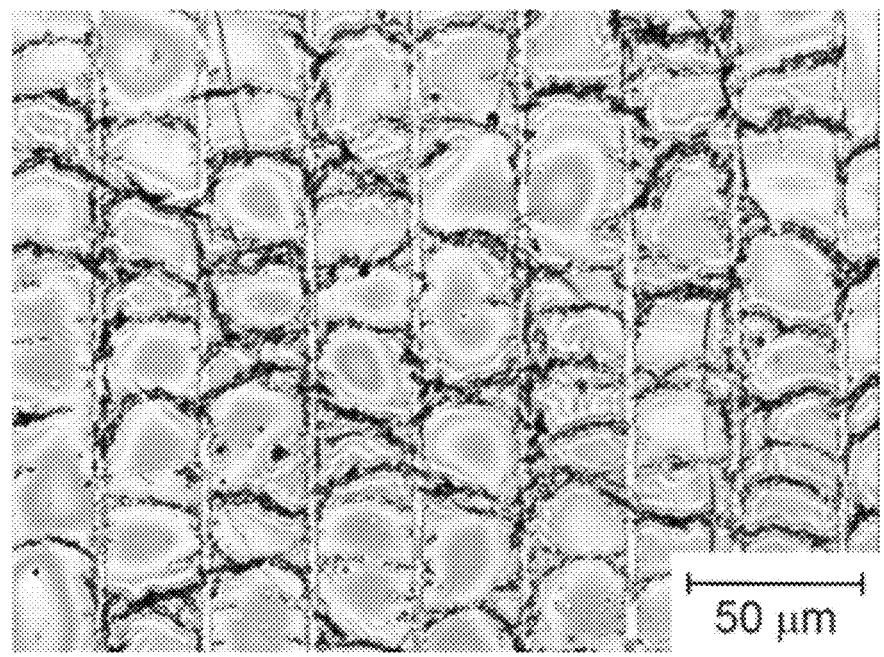
FIG. 8 shows an optical micrograph of aligned and cured film of nanocone adhesives in in-plane geometry after pyrolysis.

The material was otherwise the same and the procedure similar as in example 1 but all or part of the matrix was removed from the aligned and cured film. In typical procedure the aligned and cured film was heated at 450° C. from 10 minutes to 2 hours. As a result of this procedure step, the thickness of matrix was greatly reduced between the conductive channels and instead of a uniform film with aligned conductive channels embedded into it, a film with distinctive solitary network was achieved (see FIG. 8).

Figure 9:
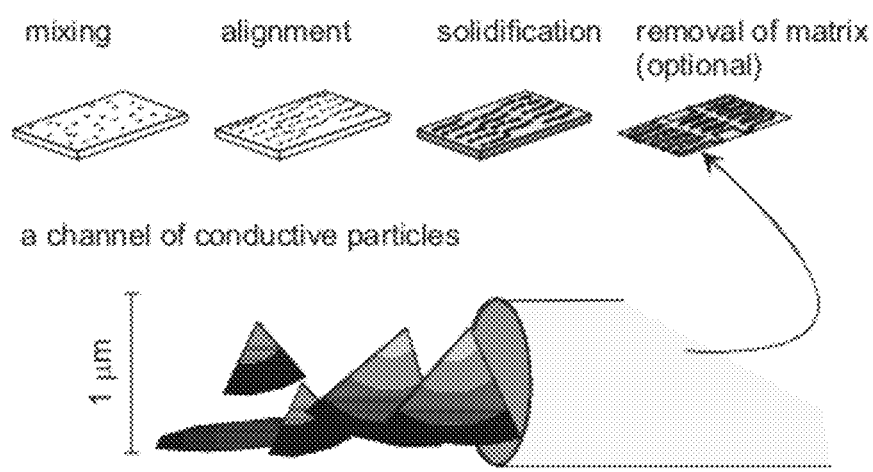
FIG. 9 illustrates the steps to produce aligned conducting.

This procedure can be performed similarly to the materials examples shown in examples 1, 2, 3, 4, or 5. Alternative overall steps are illustrated in FIG. 9, which illustrates the steps to produce aligned conducting film. From left to right: Molecules are dispersed into fluid which can be thermoset, thermoplastic or lyotropic material. Thin film of this dispersion is spread over a substrate. Aligned particle channels forming conductive channels are formed by applying an electric field. Solid uniform film with aligned conductive channels is formed by changing the viscosity. In the case of thermoset matrix this is achieved by curing the matrix polymer. In the case of thermoplastic matrix this is achieved by decreasing the alignment temperature below a phase transition such as melting point or glass transition of the matrix. In the lyotropic case the alignment is performed with the presence of solvent and the solidification obtained by evaporating solvent off. A network of separated aligned wires may be formed by removing part or the entire matrix, for instance by a selective solvent or by pyrolysing a part of the solid matrix.

Example 10

This example concerns further versatility of the invention, the use of electric field alignment when preparing electrodes with very large contact area dendrimer surface.

Figure 10:
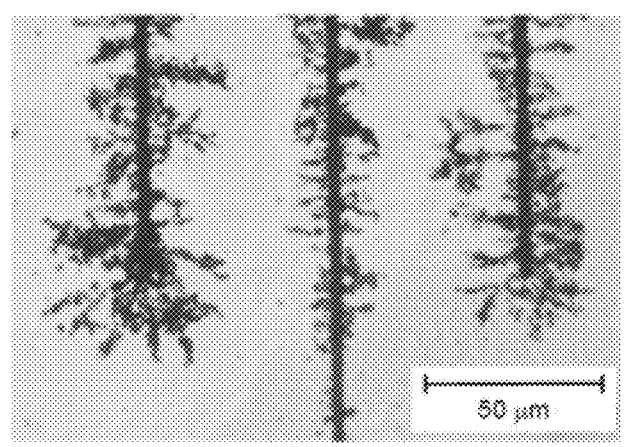
FIG. 10 illustrates dendritic structures maximizing the contact area between conductive item and matrix.

The procedure was otherwise similar to that in examples 1, 2, 3, 4, 5, 7, 8, or 9 but the alignment was terminated before the chains reached from electrode to electrode. FIG. 10 shows so obtained electrodes with dendritic surface.

II. Electrostatic Discharge

The method of the present invention is for manufacturing an ESD device which has at least one anisotropic conductive layer comprising a mixture of a matrix and conductive particles. The steps are:

a. applying a layer of the mixture over a first surface of the ESD device, the mixture having a first viscosity which allows the conductive particles to rearrange within the layer;

b. applying an electric field between two alignment electrodes, over the layer, so that a number of the conductive particles are aligned with the field, thus creating conductive pathways;
c. changing the viscosity of the layer to a second viscosity, said second viscosity being higher than the first viscosity in order to mechanically stabilise the layer and preserve the conductive pathways.

Note that the first surface could be used as an alignment electrode, so there is no need to use a separate electrode. The electrodes may also be remote and thus insulated from the mixture.

The method can be performed in a production line for ESD devices; the production line may comprise the steps:
i. Polymer resin is mixed with CB according to the present invention to form a matrix
ii. the matrix is formed to a film, or an object is dipped in the matrix or it is sprayed on or poured over
   a. for films the layer has a thickness from 0.1 to 5 mm, preferably less than 3 mm.
   b. for thin mats the layer has up to 3 cm in thickness, preferably less than 2 cm in thickness
   c. for thick mats the layer has up to 50 cm in thickness, preferably less than 5 cm in thickness
iii. an electrical field according to the present invention is applied
iv. the matrix is cured, using e.g. UV light or heat
v. optionally the matrix is reduced, so as to expose the conducting pathways
vi. optionally steps ii to v is repeated The method can also be performed in a production line where a conductive layer or wires are to be connected or laminated. The production line may comprise the steps:
i. epoxy is mixed with CB according to the present invention to form a matrix
ii. the matrix is formed to a film or paste and used as glue where conductivity between layers or components or wires are wanted
iii. an electrical field according to the present invention is applied
iv. the matrix is cured, using e.g. UV light or heat.

Example 11

This example concerns the preparation of a mixture of conductive particles and polymer matrix which is a thermally cured polymer adhesive. It also shows the conductivity as a function of particle load and how the step-like increase in conductivity with increasing particle load can be explained by formation of conductive paths between particles when the contacts are formed with increased particle fraction.

This example concerns moreover the preparation of the same mixture when the particle load is low, for example 10 times less than the observed percolation threshold, the limit where the isotropic non-aligned mixture is not conductive; as well as the alignment of this mixture using electric field so that the aligned particles form conductive paths resulting in a conductive material, whose conductivity is directional, for example below the percolation threshold of non-aligned material. The example, moreover, shows the change of the viscosity of the resulting material obtained, for instance by curing, so that the alignment and directional conductivity obtained in the alignment step is maintained. The employed conductive particles were CB from Alfa Aesar, CNC material from n-Tec AS (Norway) and iron oxide ($FeO.Fe_2O_3$) from Sigma-Aldrich.

The employed polymer matrix was a two component low viscosity adhesive formed by combining Araldite® AY 105-1 (Huntsman Advanced Materials GmbH) with low viscosity epoxy resin with Ren® HY 5160 (Vantico AG).

The conductive particles were mixed in the adhesive by stirring for 30 minutes. Due to the high viscosity of mixture, efficient mixing is possible only up to 20 vol-%.

Estimated percolation thresholds of these materials are at ~2 vol-%. The mixtures are conductive above and insulators below this threshold. The conductivity is due to the conductive particles and the polymer is an insulator.

To illustrate the benefit of alignment, the materials were the same and similarly prepared as in above but ten times lower particle loads were used.

Figure 11:
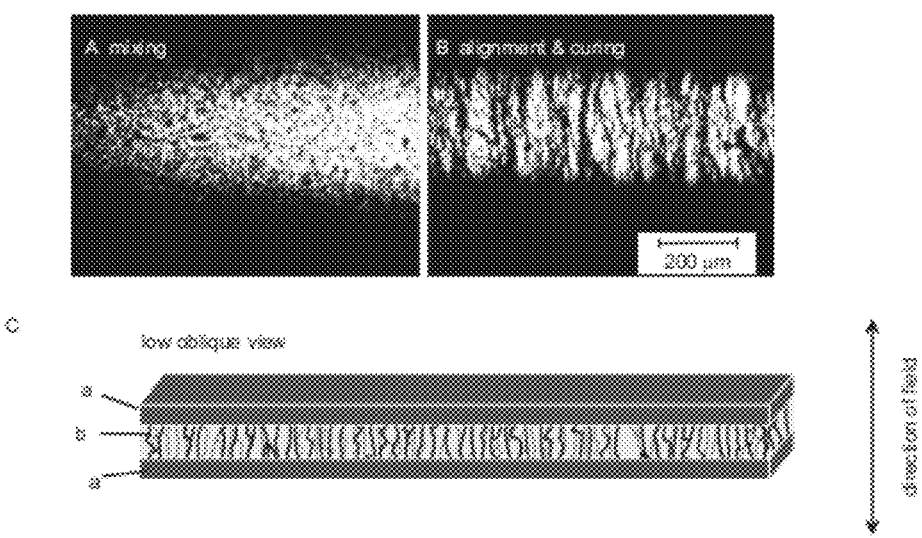
FIG. 11 shows optical micrographs of conductive particle assemblies before and after alignment.

FIG. 11 illustrates, using optical micrographs, the mixing of assemblies of 0.2 vol-% CNC particles dispersed into the example adhesive before (FIG. 11A) and after an electric field alignment and curing (FIG. 11B).

The scheme shows the applied alignment (out-of-plane) geometry (FIG. 11C). This alignment geometry was used to cover conductive path distances from 10 μm to centimeters, preferentially to millimeters. For an out-of-plane alignment 2 mm×3 cm wide layer of material is injected between two conductive layers (a).

Mixture was aligned using an AC source to obtain aligned pathways (b). In this example the alignment procedure 1 kHz AC-field (0.6-4 kV/cm (rms value)) was employed for 10 minutes for >1 mm electrode spacing and <10 minutes for <1 mm electrode spacing.

Figure 12:
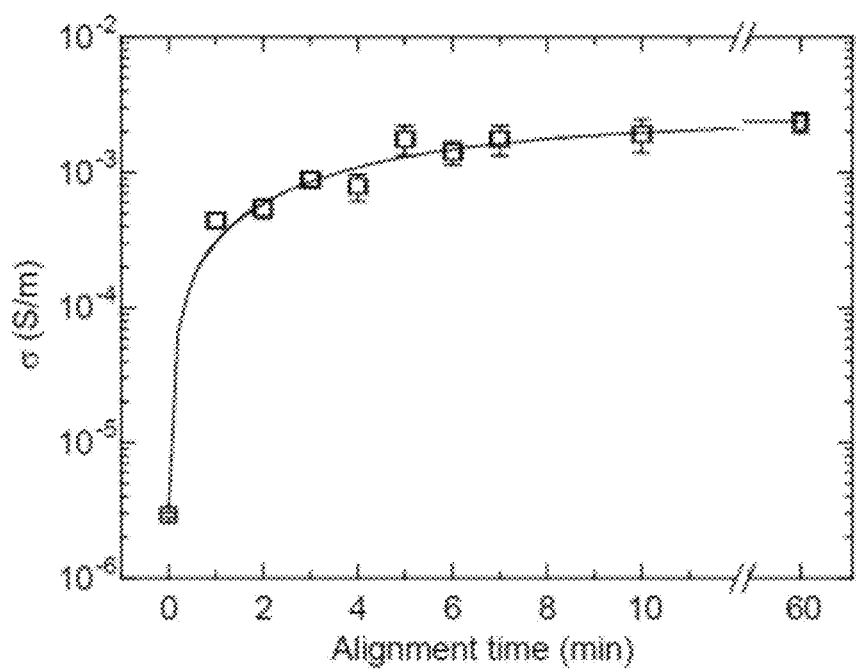
FIG. 12 shows a plot of the dependence of DC conductivity of 0.2 vol-% CNC particles dispersed into the adhesive against the alignment time. The solid line is guide to eye.

The dependence of DC conductivity of 0.2 vol-% CNC particles dispersed into the adhesive against the alignment time is shown in FIG. 12. The solid line is guide to eye. The curing was performed immediately afterwards at 100° C. for 6 minutes.

The material remains aligned after curing and conductivity level obtained by alignment is maintained.

Example 12

This example concerns versatile choice of alignment conditions and illustrates how the present invention can be employed not only with electrodes connected to the orientation material but also with electrodes electrically isolated from the material.

The procedure was otherwise similar to that in Example 11, but instead of having material directly connected to the alignment electrodes, the electrodes were electrically disconnected from the material by an insulating layer, for example by 0.127 mm Kapton® foils. Alignment occurred exactly as in Example 11.

Figure 13:
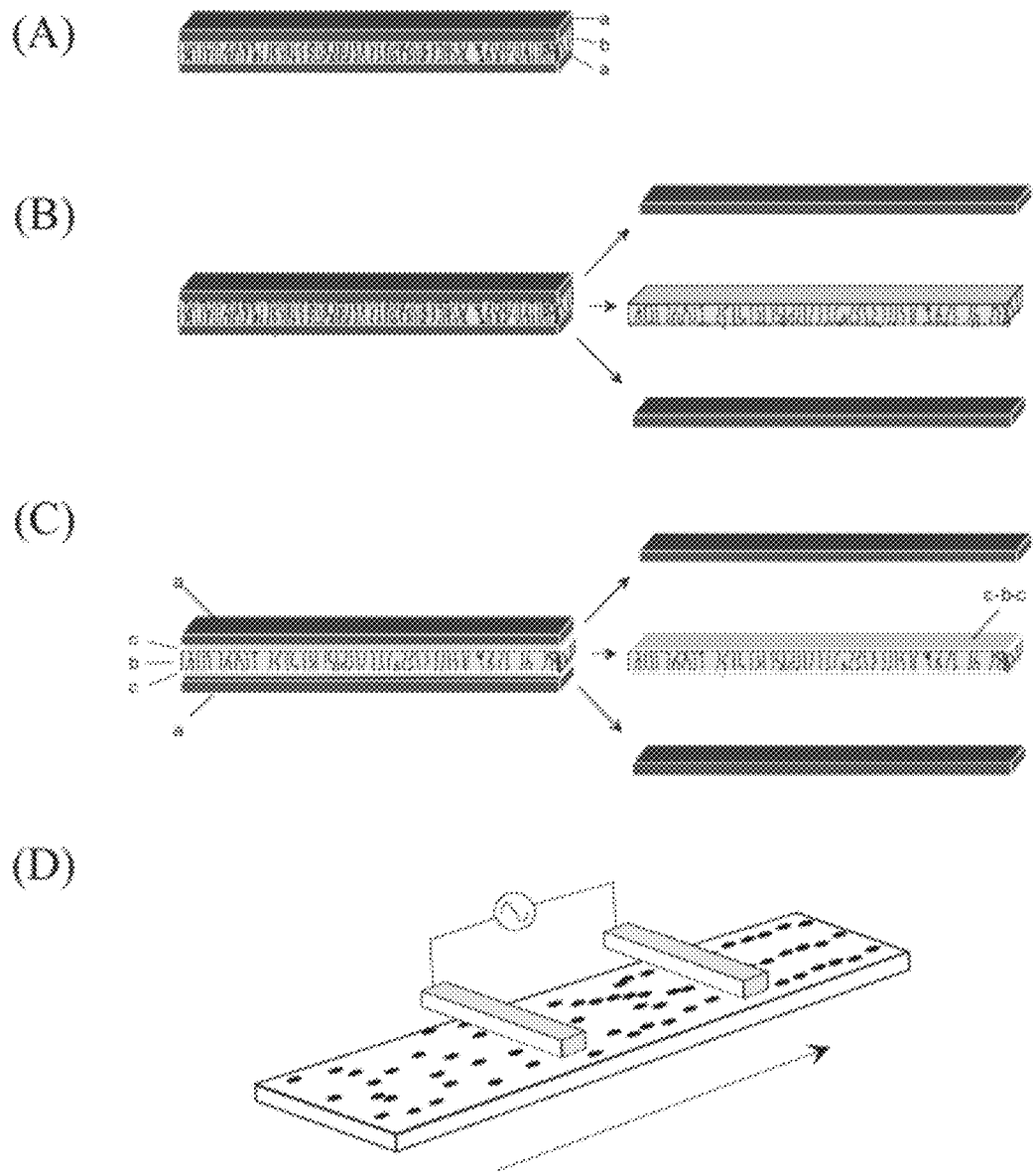
FIG. 13 shows aligned film with (A-B) and without (C-D) electrical contacts between electrodes (a) and material (b).

This procedure allows removal of electrodes after alignment and thus freestanding aligned film even in the case where the matrix is adhesive. The alignment also occurs if the electrodes do not touch the material and so the alignment can be performed from a distance. When the material and electrodes are moved, continuous or stepwise, with respect to each others during the alignment, this allows continuous alignment processing. Three possible options for the alignment settings are illustrated in FIG. 13 that shows aligned film with (A-B) and without (C-D) electrical contacts between electrodes (a) and material (b). In the case (A) the aligned film forms permanent connection between the electrodes. In the case (B) the electrodes and material are only loosely joined together and can be moved apart after alignment. In the case (C) there are insulating layers (c) between the material and electrodes and they are easily moved apart after the alignment even in the case where the material is an adhesive. In this case the obtained material is a multilayer consisting of aligned layer (b) and two insulating layers (c) In the case (D) the alignment is carried out from the distance and the mutual location of electrodes and film can be additionally moved during the alignment.

Example 13

This example concerns the applicability of the alignment method, the use of alignment for particular application of UV-curing. This emphasises the benefit of low particle fraction which makes the material better transparent for UV light for curing.

The procedure was otherwise similar to that in Example 11 or 12 but the thermally cured polymer matrix was replaced by UV-curable Dymax Ultra Light-Weld® 3094 adhesive and the curing step was done by the UV-light with the wavelength 300-500 nm.

Figure 14:
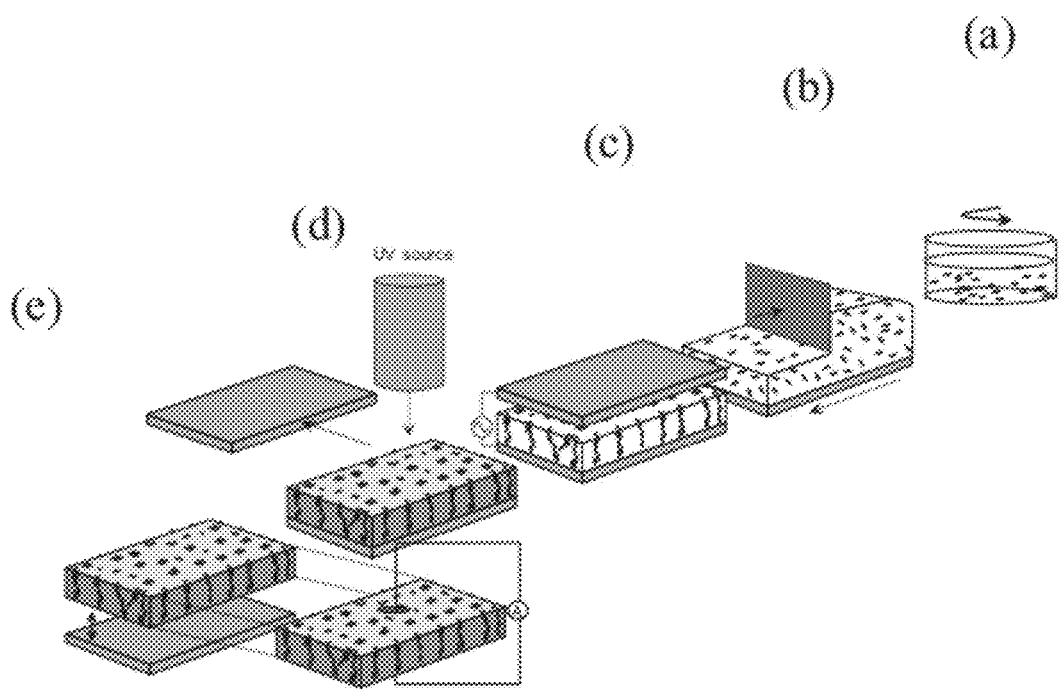
FIG. 14 shows schematics of the UV curing technique.

FIG. 14 illustrates the alignment of 0.2 vol-% CNC dispersion in out-of-plane geometry. The mixture was formed following the guideline of Example 11 (FIG. 14a) but spread on the alignment electrode using RK Print Paint Applicator that uses a moving bird applicator to level the adhesive layer to the predetermined thickness (the idea is schematically illustrated in FIG. 14b). This admixture was aligned following the method outlined in Example 12 but the upper electrode was not in contact with the material by use of an insulating layer such as Kapton (FIG. 14c); this allows removal of electrodes after alignment and thus freestanding aligned film even in the case where the matrix is adhesive. After alignment, the upper alignment electrode is removed and aligned admixture cured by UV or blue light. (FIG. 14d). The lower electrode can be optionally removed (FIG. 14e) to form a fully free-standing film.

FIG. 14 also gives the schematics of UV curing. Conductive particles are dispersed with UV-curable polymer matrix (a). This mixture is spread to form a predetermined layer on the substrate (that acts also as an alignment electrode) using an applicator (b). The material is aligned by electric field using lower electrode and another top-electrode that does not touch the material (c). The upper electrode is removed and the aligned mixture is cured using a light (UV/vis) source, which leads to a semi-freestanding aligned film (d). If required, the lower electrode can be additionally removed leading to a fully free-standing aligned film (e).

Example 14

This example concerns versatile choice of alignment geometries and illustrates how the invention can be employed not only in the geometry shown in Example 11 but also in (i) thin films and (ii) in in-plane geometry. This example underlines the generality of the method.

The material was the same and the procedure similar as in Example 11, but instead of out-of-plane alignment geometry, in-plane alignment geometry was used.

For the in-plane alignment a ~10 μm thick layer was spread either by spin-coating or by plastic spatula over 1 cm×1 cm area of metal finger grid where the thickness and width of fingers, respectively, were 50-200 nm and 2-10 μm. The spacing between fingers was 10-100 μm.

Figure 15:
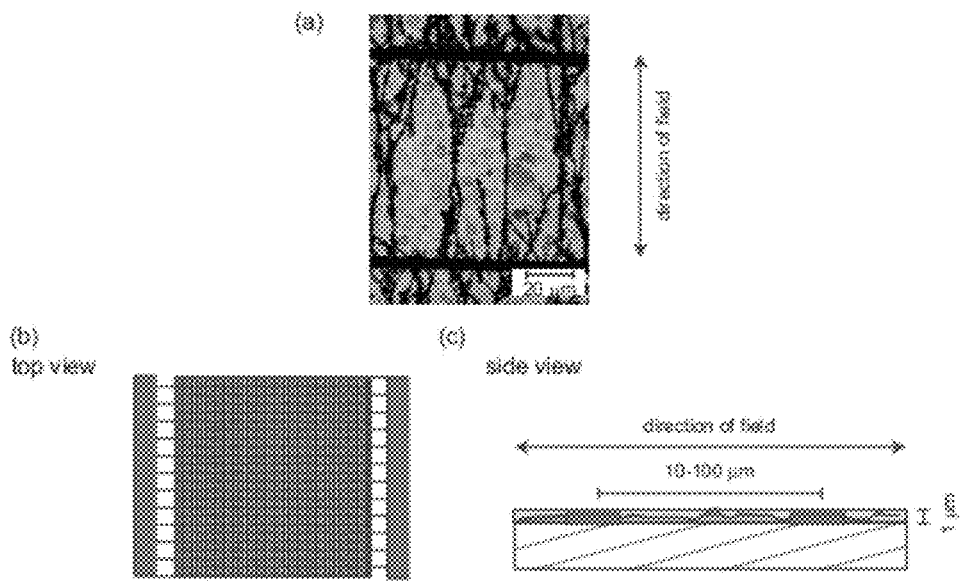
FIG. 15 a-c depicting aligned and cured conductive nanocone adhesives in in-plane geometry.

FIG. 15 illustrates aligned and cured conductive CNC adhesives in in-plane geometry. FIG. 15a shows an optical micrograph of 0.2 vol-% aligned material. Schematic (FIG. 15b) illustrates the alignment setting. In this geometry the alignment occurs typically in seconds or tens of seconds.

In another version the alignment electrodes were electrically insulated. Alignment was achieved exactly as without insulating layer.

Example 15

This example concerns versatile choice of alignment geometries and illustrates how the invention can be employed not only in the out-of-plane and in-plane geometries with flat well defined electrodes but also when the geometry and electrode shape is arbitrary. This example underlines the generality of the method. This also illustrates that the alignment does not require a surface or interface parallel to the emerging aligned pathways.

Figure 16:
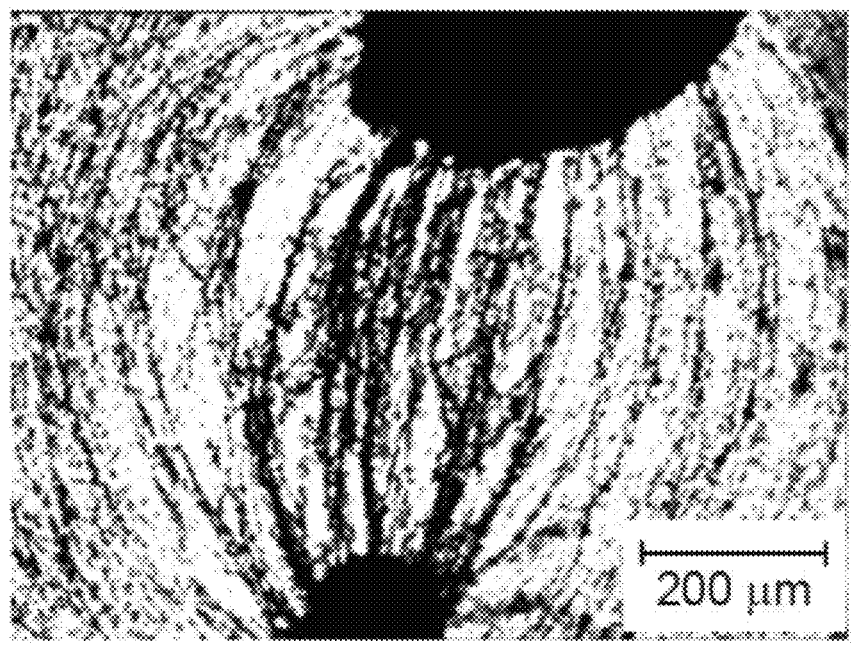
FIG. 16 shows aligned material with arbitrary alignment geometry and arbitrary electrode shape.

The materials were otherwise the same and the procedure similar as in Examples 11, 12, 13, or 14 but instead of out-of-plane or in-plane alignment geometry and flat electrodes, arbitrary geometry and arbitrary electrode shape were used. FIG. 16 shows an optical micrograph of an aligned material when arbitrary geometry and arbitrary electrode shapes were used.

Example 16

This example concerns further versatility of the invention, the use of electric field alignment when preparing electrodes with very large contact area dendrimer surface.

Figure 17:
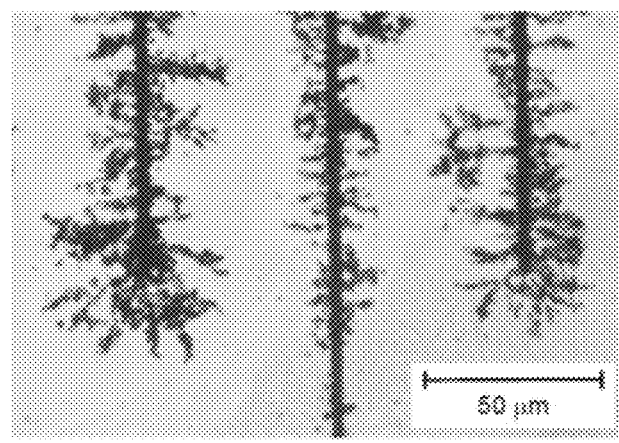
FIG. 17 illustrates "dendritic" structures maximizing the contact area between conductive item and matrix.

The procedure was otherwise similar to that in Examples 11, 12, 13, 14, or 15 but the alignment was terminated before the chains reached from electrode to electrode. FIG. 17 shows thus obtained electrodes with dendritic surface.

This can be used for making a film for use in batteries or capacitors.

Example 17

This example concerns the materials selection for the procedure described in Example 11, 12, 13, 14, 15 or 16.

Polymeric material, including polyvinyl chloride resin, suitable for the described alignment process for flooring may be homopolymers, or copolymers, consisting of vinyl chloride and other structural units, such as vinyl acetate. To protect the polymeric material from degradation during processing and during its use as flooring material, vinyl compounds may be stabilized against the effects of heat and ultraviolet radiation, using e.g. soaps of barium, calcium and zinc; organo-tin compounds; epoxidized soy bean oils and tallate esters or organic phosphites.

Polymeric materials may contain plasticizers to provide flexibility and to facilitate processing. One suitable plasticizer is dioctyl phthalate (DOP). Others suitable ones may include butylbenzyl phthalate (BBP), alkylaryl phosphates, other phthalate esters of both aliphatic and aromatic alcohols, chlorinated hydrocarbons, and various other high boiling esters.

The stabilized and plasticized vinyl formulation is mixed with varying amounts of inorganic filler to provide mass, colour and thickness at a reasonable cost. The fillers may be calcium carbonate, talcs, clays and feldspars. White pigment can be titanium dioxide and coloured pigments are preferably inorganic.

Other additives can be used to avoid flame spread and smoke generation during a fire. These compounds include alumina trihydrate, antimony trioxide, phosphate or chlorinated hydrocarbon plasticizers, zinc oxide, and boron compounds. Cushioned flooring containing chemically expanded foam can be compounded with azobisformamide blowing agents. Various other processing aids and lubricants may also be employed.

The amount of filler can be less than 1% or up the 80% of the weight, whereas as vinyl resin, other resins, plasticizer and stabilizer can be less than 1% or amount to 20%.

Example 18

The procedure was otherwise similar to that in Examples 11, 12, 13, 14, 15 or 16 but the aligned material was used produce a top layer that is laminated with the flooring material.

Example 19

The procedure was otherwise similar to that in Examples 11, 12, 13, 14, 15 or 16 but the aligned material was used as a part of furniture or work-station.

Example 20

The procedure was otherwise similar to that in Examples 11, 12, 13, 14, 15 or 16 but the aligned material was used as a part of shoe or a gasket.

Example 21

The procedure was otherwise similar to that in Examples 11, 12, 13, 14, 15 or 16, but the aligned material was use as a part of packaging material.

Example 22

The procedure was otherwise similar to that in Examples 11, 12, 13, 14, 15 or 16 but the aligned material was use as a part of a battery or capacitor.

Example 23

The procedure was otherwise similar to that in Examples 11, 12, 13, 14, 15 or 16 but the aligned material was made into a sheet of up to 5 cm in thickness, preferably less than 1 cm in thickness and less than 10 m wide. Said sheet can then be stored and used in the production of large parts for use in vehicles, computers and printers, for example, by cutting or thermoforming.

III. Solar Cell

Example 24

This example concerns the preparation of a mixture of conductive particles and polymer matrix that in this example is an thermally cured polymer adhesive; as well as determination of conductivity as a function of particle load; and how the step-like increase in conductivity with increasing particle load can be explained by formation of conductive paths between particles when the contacts are formed with increased particle fraction.

This example concerns moreover the preparation of the same mixture when the particle load is low, for example 10 times less than the observed percolation threshold, the limit where the isotropic non-aligned mixture is not conductive; as well as the alignment of this mixture using electric field so that the aligned particles form conductive paths resulting in a conductive material, whose conductivity is directional, for example below the percolation threshold of non-aligned material. The example, moreover, shows change of the viscosity of so obtained material, for instance by curing, so that the alignment and directional conductivity obtained in the alignment step is maintained.

The employed conductive particles were carbon black from Alfa Aesar, carbon cones (CNCs) from n-Tec AS (Norway) and iron oxide (FeO.Fe$_2$O$_3$) from Sigma-Aldrich.

The employed polymer matrix was a two component low viscosity adhesive formed by combining Araldite® AY 105-1 (Huntsman Advanced Materials GmbH) with low viscosity epoxy resin with Ren® HY 5160 (Vantico AG).

The conductive particles were mixed in the adhesive by stirring for 30 minutes.

Estimated percolation threshold of these materials is at ~2 vol-%. The mixtures are conductive above and insulators below this threshold. The conductivity is due to the conductive particles and the polymer is essentially insulator.

To illustrate the benefit of alignment, the materials were the same and similarly prepared as in above but ten times lower particle loads were used.

Figure 18:
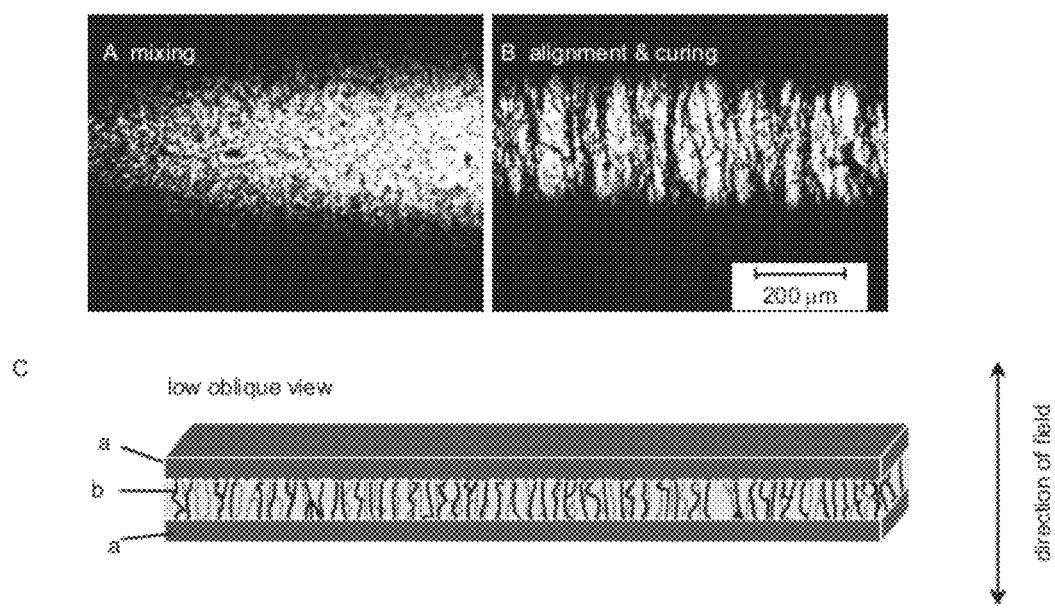
FIG. 18 A-B show optical micrographs of assemblies of 0.2 vol-% CNC particles dispersed into the adhesive and aligned by the electric field.

FIG. 18 illustrates, using optical micrographs, the mixing of assemblies of 0.2 vol-% CNC particles dispersed into the example adhesive before (FIG. 18A) and after an electric field alignment and curing (FIG. 18B).

Figure 19:
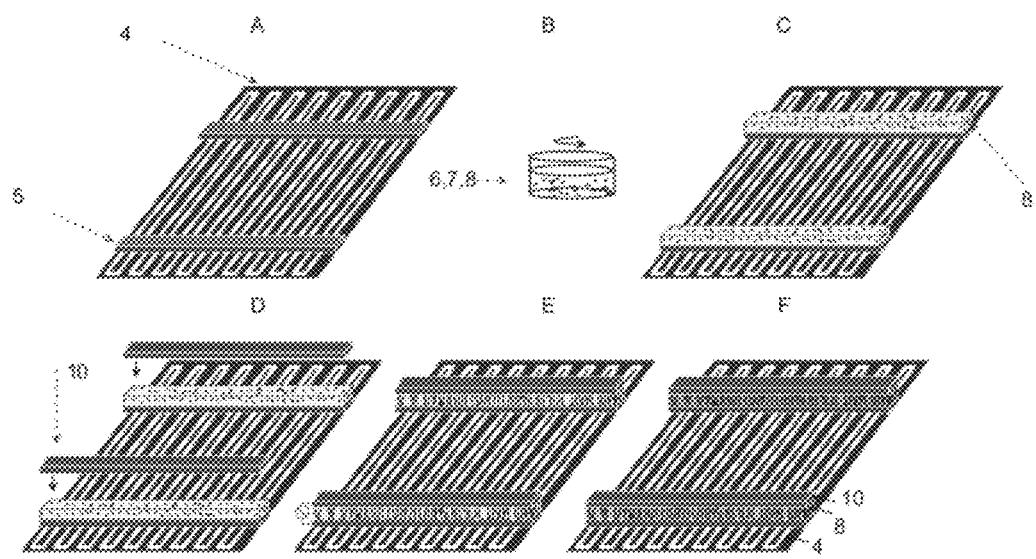
FIG. 19 A-F illustrates the connection of solar cell electrodes by conductive adhesive with aligned particles.

The scheme shows the applied alignment (out-of-plane) geometry (FIG. 18C) that corresponds to that illustrated in FIG. 19. This alignment geometry was used to cover conductive path distances 1 from 10 μm to centimeters, preferentially to millimeters. For an out-of-plane alignment 2 mm×15 cm wide layer of material is injected between the solar cell busbar 3 and the solar cell tab 2.

Mixture was aligned using an AC source to obtain aligned pathways (b). In this example the alignment procedure 1 kHz AC-field (0.6-4 kV/cm (rms value)) was employed for 1 minutes for <1 mm electrode spacing.

Figure 20:
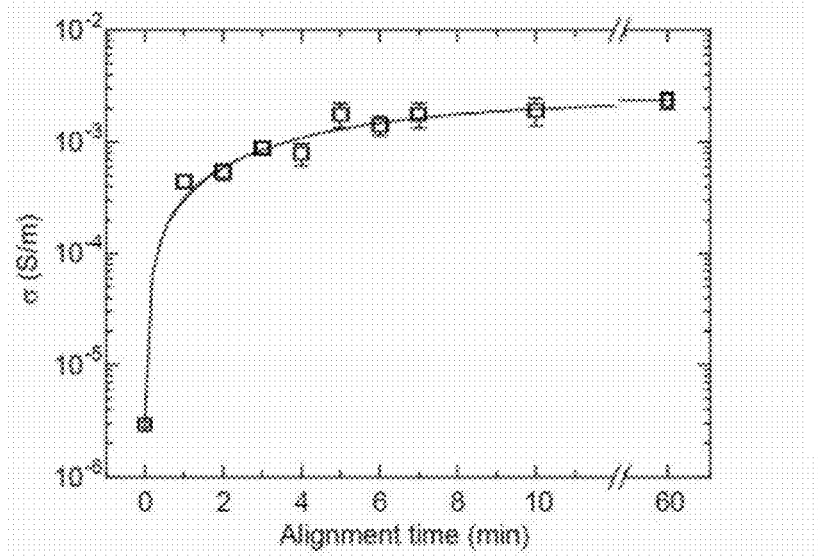
FIG. 20 plots the dependence of DC conductivity of 0.2 vol-% CNC particles dispersed into the adhesive against the alignment time. The solid line is a guide to the eye.

FIG. 20 shows the conductivity as a function of alignment time illustrating orders of magnitudes conductivity enhancement.

The curing was performed immediately afterwards at 100° C. for 1 minute.

The material remains aligned after curing and conductivity level obtained by alignment is maintained.

FIG. 19 A shows a solar cell 4 with tabs 5 collecting the current produced by the photovoltaic effect. FIG. 19 B illustrates an isotropic dispersion 8 of conductive particles 6 in an adhesive 7 having a first viscosity. The dispersion 8 is spread onto the solar cell tabs 5 forming a layer of adhesive on each tab as shown in FIG. 19 C. The external electrodes, the busbars 10 are placed on the adhesive layer, where after alignment of the conductive particles 6 is effected by application of an electric field over the electrodes 5, 10, FIG. 19 E, indicated by the AC symbol. Stabilisation of the adhesive dispersions, e.g. by curing, to a second viscosity, higher than the first viscosity, will secure the mechanical strength of the adhesive dispersion and support the aligned conductive particles thus making the adhesive dispersion conductive. The solar cell 4 is now in contact with the busbars 10, because conductive paths have been formed in the adhesive dispersion 8.

The solar cell combines the above-illustrated settings with out-of-plane geometry and short alignment distances plus conveniently low alignment voltages. In a typical example, a 1 mm×8 cm wide layer of described anisotropic adhesive with 0.2 vol-% carbon load was injected between the silver and copper electrodes of a solar cell. In this case the electrodes were pressed together and the resultant spacing was less than 100 µm. This is followed by electric field alignment and curing, the whole procedure taking typically in the order of ten minutes.

Figure 21:
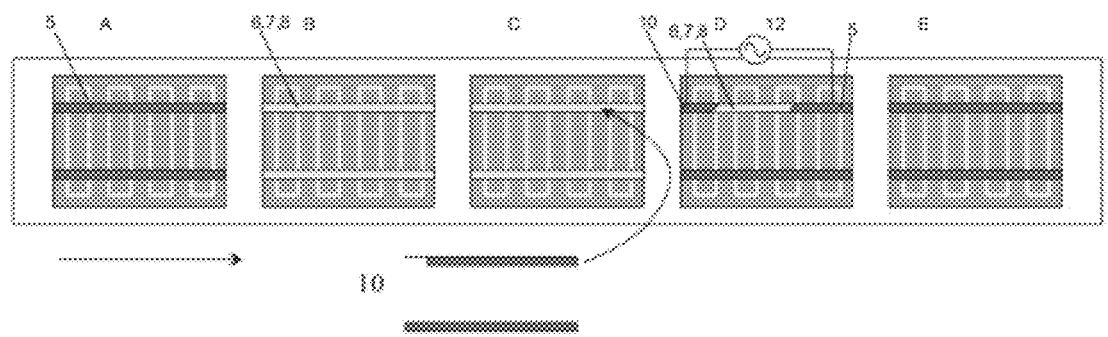
FIG. 21 A-E shows the connection of solar cell electrodes by conductive adhesive with aligned particles in a schematic process line.

FIG. 21 A-E shows a top view of the sequence described in FIG. 19. The solar cell 4 with tabs 5 are shown in FIG. 21A, The isotropic dispersion 8 of adhesive 7 and conductive particles 6 are spread on the solar cell tabs (FIG. 21 B). The busbars 10 are placed on the adhesive (FIG. 21C) and alignment of particles by applying a voltage 12 over the electrodes 5,10, FIG. 21D. Stabilisation of the adhesive e.g. by curing using e.g. UV light or heat, FIG. 21E.

Example 25

This example shows the robustness of the procedure and shows how electric field heals macroscopic defects in a conductive particle adhesive mixture.

Figure 22:
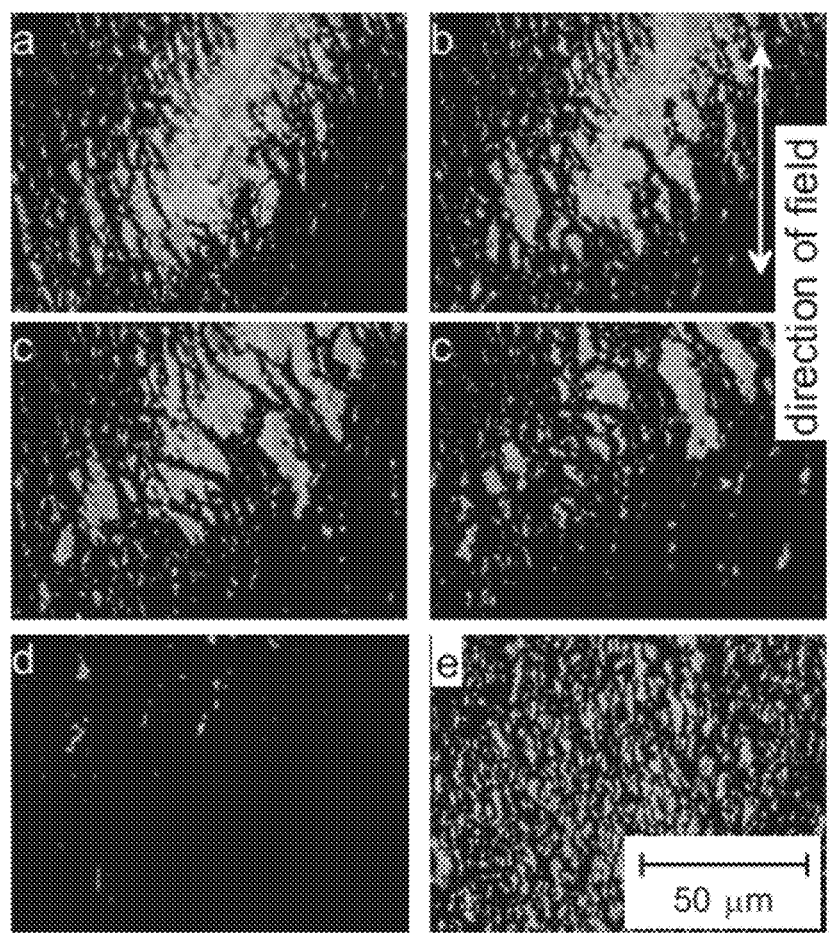
FIG. 22 shows optical micrographs showing the healing of a scratch.

FIG. 22 is optical micrographs showing the healing of the scratch in the case of CNCs. The materials and procedure was similar to that in Example 24, but a macroscopic scratch defect was made by a sharp spike; and the electric field was let on. The optical micrographs showing the healing of the scratch in the adhesive layer, an electric field of 1 kHz, 500 V/cm was let on and the conductive pathways is gradually reforming. After reforming basically all conductive particles are forming conductive pathways in the matrix.

Example 26

Figure 23:
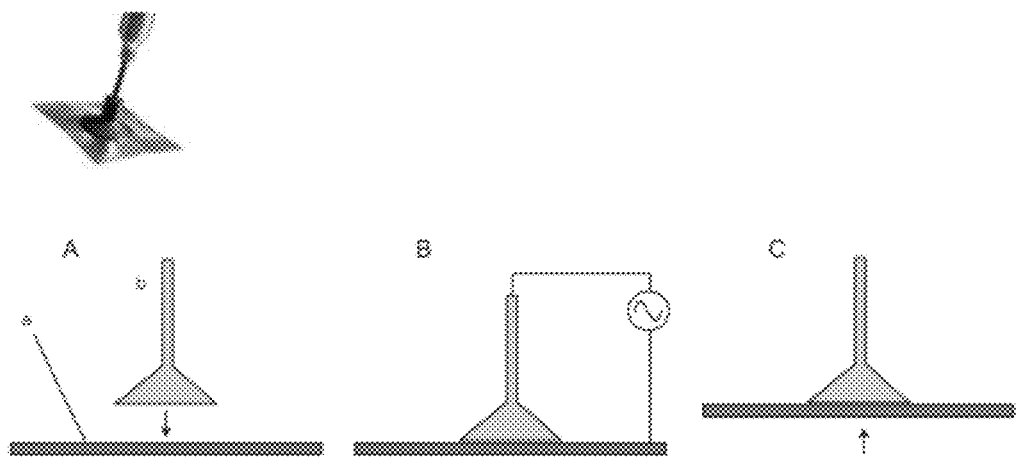
FIG. 23 illustrates how this method can be incorporated into a pick and place device.

This example shows, as illustrated in FIG. 23 how a pick and place device is fitted with an electrical field applicator so that the present invention, as explained in Example 24, can be used in solar panels with back-side contact cells. The pick and place lifts the solar cell (a) on to the encapsulation foil. Once placed the field is applied from the pick and place head (b). At this stage curing may occur via heating or UV curing if the connecting ribbons are transparent, or curing may occur during the lamination stage at the end of the production line.

Example 27

A conductive adhesive according to the present invention is used in thin-film solar panel production where transparent electrodes are used. A thin-film flexible solar cell is built on a plastic substrate using a cadmium telluride p-type layer and a cadmium sulfide n-type layer on a plastic substrate. The semiconductor layers can be amorphous or polycrystalline. A transparent conductive oxide layer overlaid by a busbar network is deposited over the n-type layer. A back contact layer of conductive metal is deposited underneath the p-type layer. The adhesive is applied and becomes conductive as in Example 24.

Example 28

For a solar cell one or more wiring members for collecting current and for transmitting current in the solar cell are made of a dispersion of a matrix and conductive particles. The concentration of said conductive particles is below a percolation threshold, so that the dispersion is not conductive. The dispersion has aligned conductive particles in areas where wiring members for collecting current meet wiring members for transmitting current.

Conductive wires are in this way formed directly to connect the solar cell devices, such that the tab or busbar is not needed to make the circuit. The adhesive dispersion of the present invention is used in one or more layered structures, e.g. one layer that is directional conductive replacing the tab, and one layer directional conductive so as to replace the conductive bars. The matrix can be reduced, e.g. by using a solvent, to expose the conductive pathways, so that the next layer can contact to these. The electrical field is applied in the corresponding directions, e.g. using a mask and a remote field, or by using parts of the solar panel under construction as electrodes, so that the conductive particles in the matrix are aligned to form the needed conductive wires.

IV. UV Polymer

The above mentioned objects are achieved by the present invention which in accordance with a first aspect of the invention concerns a method for producing a polymer composition with the ability to be cured by UV light to an anisotropic electrically conductive layer.

According to a second aspect of the invention the method concerns a polymer composition producable by means of the method according to the first aspect of the invention.

Finally, according to a third aspect the invention concerns methods for establishing an anisotropic electrically conductive layer.

Preferred embodiments of the invention are disclosed.

While it is essential to store polymer compositions which are not immediately used in a container or receptacle in which exposure to UV light is prevented, it is preferred that it is stored in a manner in which exposure to any light is prevented and in a manner in which contact with oxygen is also suppressed.

The subsequent step of making the layer, which may be in the form of a glue joint, a film, coating or free standing mat or film product, may take place weeks or months later than the production of the composition. If it is desired to obtain a product in which the conductive strings of particles (pathways) are mainly mutually parallel, an AC electric field should be applied to align the particles.

It is however worth noticing that for achieving the benefits of the polymer composition according to the present invention optimally, a number of parameters should be taken into consideration and controlled as described below.

The conductive particles are typically infusible conductive particles such as carbon particles, metal or metal coated particles, or metal oxide particles. The conductive particles show low molecular or particle anisotropy and thus the major part of the conductive particles have low aspect ratios; i.e. aspect ratio ranges of 1-5, 1-10 or 1-20 are typical. The terms "low molecular or particle anisotropy" and "low aspect ratio" have the same meaning herein. This is the case with spherical carbon black or disk-like or conical carbon particles or graphitic particles. The conductive particles can be a mixture of different carbon particles. Also other conductive particles can be used, like metal, such as silver or metal oxide particles or colloidal metal particles. The particles are typically added to the polymer preferably in the form of a non-aqueous dispersion, since significant amounts of water tend to have a negative influence.

A non-aqueous dispersion is preferable since the aqueous dispersion can experience hydrolysis under electric field ($H_2O \rightarrow H^+ + OH^-$) if the field is too high. The hydrolysis may be avoided by lowering the field. Also, hydrolysis is avoided if the water content is relatively small. This level would typically correspond at least to the impurity levels in typical organic solvents or polymer materials. It can even correspond to the water levels in azeotropic mixtures of alcohols and water. For example ethanol contains more than 11 mol-% water."

The flowable polymer composition may have inherent adhesive properties and can be based on a broad range of polymers comprising one or several polymer components and additives commonly used therewith. In particular, it can be a thermoset polymer system which is solidified by cross-linking reactions. The polymer can also be a thermoplastic polymer system or a lyotropic polymer system. It can also be any compatible combination of such polymers.

UV curing polymers generally have desirable properties in the form of rapid curing time and strong bond strength. They can cure in as short time as a second or a few seconds and many formulations can bond dissimilar materials and withstand harsh temperatures.

These qualities make UV curing polymers important in the manufacturing of items in many industrial markets such as electronics, telecommunications, medical, aerospace, glass, and optical. Unlike traditional adhesives, UV light curing polymers and polymer adhesives not only bond materials together but they can also be used to seal and coat products.

When exposed to the correct energy and irradiance in the required band of UV light, polymerization occurs, and so the polymer compositions harden or cure. The types of UV sources for UV curing include UV lamps, UV LEDs and Excimer Flash lamps.

Laminates can be built up with successively applied UV cured layers. This obviates the need for adhesive or primer layers. Thin layers can be formed in very short time, in the range of one second. There are a wide variety of UV curable vinyl monomers, particularly acrylics, with a wide variety of properties that can be combined by means of copolymers or laminates. For example strong acrylics can be combined with the fracture resistant acrylates. Acrylics could be combined with intermediate layers of cross-linked elastomers for maximizing tear strength while retaining surface hardness. Certain fluoracrylates are hard, and antireflective. They have higher specular transmission than a commonly used fluoropolymer, because fluoroacrylates can be completely amorphous and have no scattering centers. Epoxy resins have tightly linked adhesive polymer structures and can be used in surface adhesives and coatings. Such epoxy resins forms cross-linked polymer structures that have strong adhesion and low shrinkage.

There are many systems available for UV curing an adhesive, coating or film. The Dymax Heavy-Duty UV curing Widecure™ Conveyor Systems is an example of a system mounted on a conveyor belt. Dymax BlueWave LED Prime UVA used LED light and thus use less effect and have constant high intensity.

A highly desirable characteristic when using the object of present invention is that conductive paths can be formed of predominantly low aspect ratio particles like carbon black, carbon nanocones and/or graphene and the formation can take place at low electric field strengths. This simplifies the production equipment and enables both larger surfaces and thicker films to be produced. The carbon black and carbon nanocones and graphitic particles are considerably less expensive than the carbon nanotubes and can be produced in sufficient quantities by industrial methods. Moreover, it is more difficult to form uniform dispersions with carbon nanotubes.

Another highly desirable characteristic of the present invention is that a comparably low concentration of conductive particles may be used. For conductive mixtures a percolation threshold is defined as the lowest concentration of conductive particles necessary to achieve long-range conductivity in the random system. With the polymer composition according to the present invention the concentration of conductive particles required for achieving conductivity in a predefined direction is not determined by the percolation threshold and can be much lower. For practical reasons the concentration of particles is determined by the requirements on the conductive paths desired to build when using the polymer composition, there usually being no reason to have excess amounts of conductive particles not arranged into the conductive paths. The concentration of conductive particles in the polymer composition can be up to 10 times lower than the percolation threshold or even lower. Concentrations of conductive particles is typically in the range of 0.2-10% by volume or 0.2-2 or 0.2-1.5% by volume. It could even be less than 0.2% in some embodiments, e.g. 0.1% by volume.

Such a low particle concentration has several advantages. The tendency of particle segregation in the dispersion is reduced and the shelf life thereby correspondingly increased, the cost of the components is reduced, the mechanical strength of the subsequently formed anisotropic conductive film is increased and the optical transparency is increased thereby enhancing the sensivity to UV light, allowing a more rapid and less power consuming curing process. The increased transparency may also be seen to improve the aestetic properties of the cured products and gives mechanical and optical properties closer to that of polymers without conductive particles.

The subsequent use of the object of the present invention includes but is not limited to:

electrostatic discharge (ESD) devices, conductive glue and adhesives for use in solar panels and electronics or to suppress electromagnetic interference (EMI). Also possible is to apply material on cellulose based paper that would not allow thermal curing.

The aspect ratio as discussed herein is defined as the ratio between the largest linear dimension of a particle and the largest dimension perpendicular to said largest dimension. "Low aspect ratio" as used herein refers to an aspect ratio less than 20, more preferably less than 10 and even more preferably less than 5.

The conductive particles are typically chosen among the groups comprising metal particles, metal coated particles, metal oxide particles and carbon particles as well as any combination of particles from two or more of said groups.

The composition according to the present invention may be used as glue, i.e. to glue two objects together as well as establish an anisotropic electrically conductive layer on top of a single surface (substrate).

Alternatively, the composition according to the present invention may be used to establish an anisotropic thermally conductive layer. An adequate use for such thermal conductive layers may be to dissipate heat from certain electronic components, e.g. within a computer.

The method and composition can also be used to produce a free-standing polymer film.

In a preferred embodiment the aspect ratio for a majority (more than 50%) of the conductive particles is in the range below 5, the aspect ratio for at least 75% of the conductive particles is below 10, and the aspect ratio for at least 90% of the conductive particles is below 20.

What is claimed is:

1. A method for producing a polymer composition with the ability to be cured by UV light to an anisotropic electrically conductive polymer layer, comprising the steps of:

providing a non-conductive matrix of a flowable polymer composition having inherent photocurability;

adding to said matrix conductive particles having a predetermined aspect ratio in an amount sufficiently low to allow the concentration of the conductive particles to be maintained at a level lower than the percolation threshold of isotropic mixture; and placing the thus formed composition in a receptacle in which exposure to UV light is prevented;

wherein the aspect ratio is defined as the ratio between the largest linear dimension of a particle and the largest dimension perpendicular to said largest dimension, wherein the aspect ratio for a majority of the conductive particles is in the range below 5, wherein the aspect ratio for at least 75% of the particles is in the range below 10, and wherein the aspect ratio for at least 90% of the conductive particles is in the range below 20.

2. A method in accordance with claim 1, wherein the conductive particles are chosen from carbon particles, metallic particles, metal coated particles, and metal oxide particles or any combination thereof.

3. A method in accordance with claim 2, wherein the conductive particles are carbon particles comprising particles of carbon black, or carbon nanocones, or graphitic particles, or graphene or any combination thereof.

4. A method in accordance with claim 1, wherein the polymer matrix is adhesive in nature.

5. A method in accordance with claim 1, wherein the conductive particles being present in the non-conductive matrix in a concentration in the range 0.1-10% by volume.

6. A method in accordance with claim 1, wherein the conductive particles being present in the non-conductive matrix in a concentration in the range 0.1-2% by volume.

7. A method in accordance with claim 1, wherein the conductive particles being present in the non-conductive matrix in a concentration in the range 0.1-1.5% by volume.

8. A method in accordance with claim 1, wherein the conductive particles are added as a predominantly non-aqueous dispersion.

* * * * *

UNITED STATES PATENT AND TRADEMARK OFFICE
CERTIFICATE OF CORRECTION

PATENT NO. : 10,090,076 B2
APPLICATION NO. : 13/326579
DATED : October 2, 2018
INVENTOR(S) : Matti Knaapila et al.

Page 1 of 1

It is certified that error appears in the above-identified patent and that said Letters Patent is hereby corrected as shown below:

On the Title Page

Item (63):
Replace "Continuation-in-part of application No. PCT/NO2010/000242, filed on Jun. 22, 2010, which is a continuation-in-part of application No. PCT/NO2010/000241, filed on Jun. 22, 2010, which is a continuation-in-part of application No. PCT/NO2010/000249, filed on Jun. 22, 2010."

With --Continuation-in-part of application No. PCT/NO2010/000242, filed on Jun. 22, 2010, and continuation-in-part of application No. PCT/NO2010/000241, filed on Jun. 22, 2010, and continuation-in-part of application No. PCT/NO2010/000249, filed on Jun. 22, 2010.--

Signed and Sealed this
Eighth Day of January, 2019

Andrei Iancu
*Director of the United States Patent and Trademark Office*